(12) United States Patent
Heo et al.

(10) Patent No.: US 12,705,922 B2
(45) Date of Patent: Aug. 11, 2026

(54) READOUT CIRCUIT AND DISPLAY DEVICE INCLUDING THE SAME

(71) Applicant: SAMSUNG DISPLAY CO., LTD., Yongin-si (KR)

(72) Inventors: Sanghyun Heo, Yongin-si (KR); Joon-Chul Goh, Yongin-si (KR); Ohjo Kwon, Yongin-si (KR); Taehun Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 31 days.

(21) Appl. No.: 18/670,171

(22) Filed: May 21, 2024

(65) Prior Publication Data

US 2026/0011174 A1 Jan. 8, 2026

(30) Foreign Application Priority Data

Aug. 1, 2023 (KR) ........................ 10-2023-0100640

(51) Int. Cl.

*G06V 40/13* (2022.01)
*G06F 3/041* (2006.01)
*G06F 3/042* (2006.01)
*G09G 3/3233* (2016.01)

(52) U.S. Cl.

CPC ........ *G06V 40/1318* (2022.01); *G06F 3/0412* (2013.01); *G06F 3/0421* (2013.01); *G09G 3/3233* (2013.01); *G09G 2300/0819* (2013.01); *G09G 2300/0842* (2013.01); *G09G 2300/0861* (2013.01); *G09G 2310/08* (2013.01); *G09G 2354/00* (2013.01); *G09G 2360/14* (2013.01)

(58) Field of Classification Search

None

See application file for complete search history.

(56) References Cited

U.S. PATENT DOCUMENTS

| | | | |
|---|---|---|---|
| 9,130,175 | B2 | 9/2015 | Lee et al. |
| 10,256,414 | B2 | 4/2019 | Lim et al. |

FOREIGN PATENT DOCUMENTS

| | | |
|---|---|---|
| KR | 10-2195813 | 12/2020 |
| KR | 10-2270705 | 6/2021 |

*Primary Examiner* — Aneeta Yodichkas

(74) *Attorney, Agent, or Firm* — F. CHAU & ASSOCIATES, LLC

(57) ABSTRACT

A display device includes a display panel and a readout circuit. The display panel includes a pixel including a light emitting element, a sensor including a light sensing element, and a dummy sensor. The readout circuit outputs a readout signal based on a sensing signal received from the sensor and a dummy sensing signal received from the dummy sensor. The readout circuit includes a reference current conveyor that outputs a reference signal corresponding to the dummy sensing signal, and a sensing circuit that outputs the readout signal corresponding to a difference between the sensing signal and the reference signal.

20 Claims, 15 Drawing Sheets

FIG. 3

FSS
1300
1000
ADC
VCM1
VCM2
1200
MC1
MC2
P1
P1A
P3
VREF
ICC
1100
MIR2
VBP
VBN
V1
V2
BF1
V0
VREF
MIR1
RV1
RV2
2000
MIR3
BF3
FSj
DFS
RV1
RV2
IREF

FIG. 14

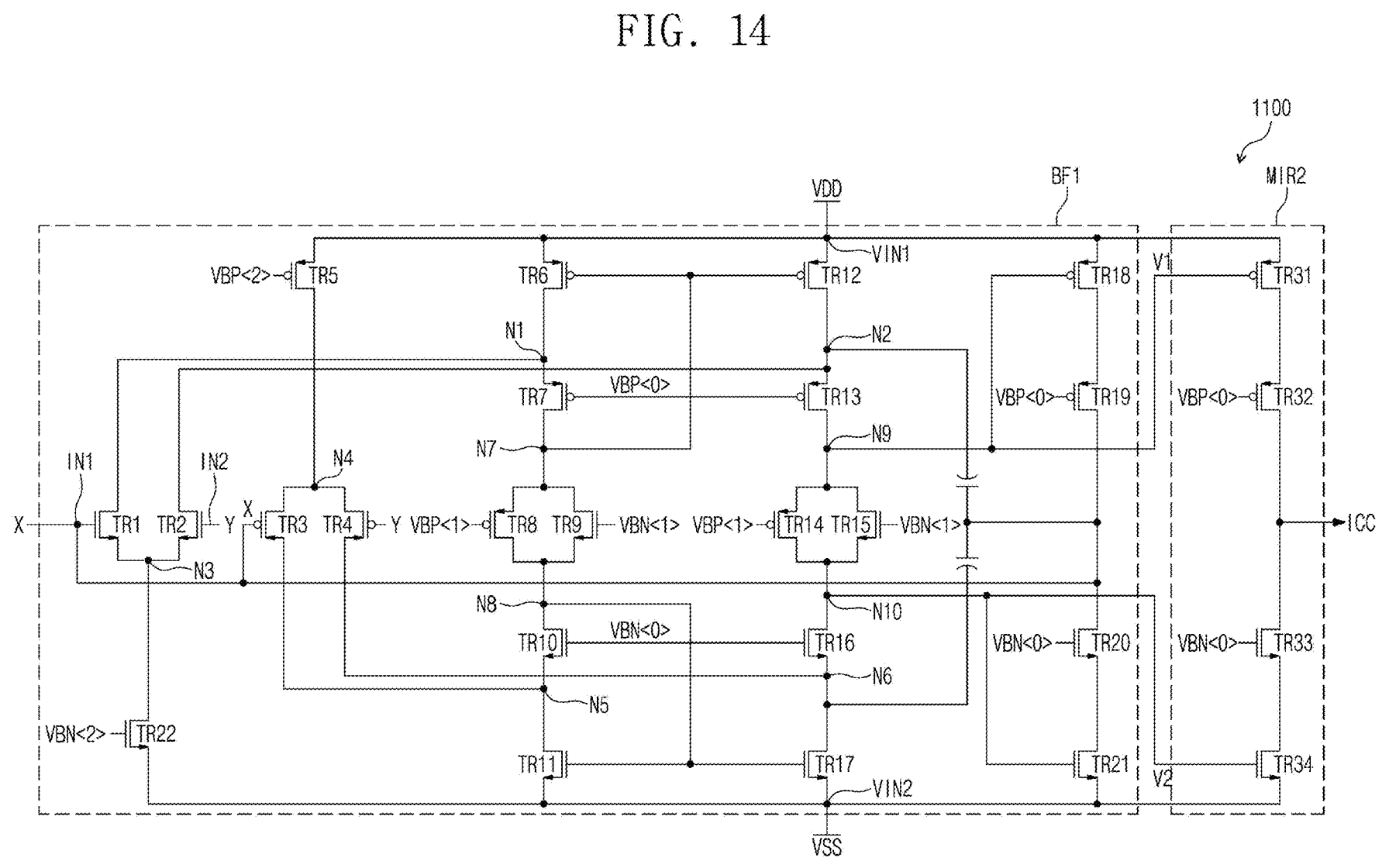

1100
ICC
MIR2
TR31
TR32
TR33
TR34
VBP<0>
VBN<0>
V1
V2
BF1
TR18
TR19
TR20
TR21
VBP<0>
VBN<0>
VBN<1>
VDD
VIN1
N2
N9
N10
N6
VIN2
VSS
TR12
TR13
TR14
TR15
TR16
TR17
VBP<1>
VBP<0>
VBN<1>
VBN<0>
N5
TR6
TR7
TR8
TR9
TR10
TR11
N1
N7
N8
VBP<1>
Y
N4
TR5
TR3
TR4
VBP<2>
X
Y
IN2
N3
TR2
TR1
TR22
IN1
VBN<2>
X

READOUT CIRCUIT AND DISPLAY DEVICE INCLUDING THE SAME

CROSS-REFERENCE TO RELATED APPLICATIONS

This patent application claims priority under 35 U.S.C. § 119 to Korean Patent Application No. 10-2023-0100640 filed on Aug. 1, 2023, in the Korean Intellectual Property Office, the disclosure of which is incorporated by reference in its entirety herein.

1. TECHNICAL FIELD

Embodiments of the present disclosure described herein are directed to a display device capable of detecting biometric information of a user.

2. DISCUSSION OF RELATED ART

A display device provides various functions for providing information to a user by displaying an image or communicating with the user by detecting an input of the user. The display device may provide a function to detect biometric information of the user. Examples of biometric information include a fingerprint, blood pressure and a pulse.

A capacitive scheme for recognizing biometric information detects a change in capacitance between electrodes and determines the biometric information from the detected change. An optical scheme for recognizing biometric information detects incident light by using an optical sensor and determines the biometric information from the detected light. An ultrasonic scheme for recognizing biometric information detects a vibration by using a piezoelectric material or the like and determines the biometric information from the detected vibration.

SUMMARY

At least one embodiment of the present disclosure provides a display device including a sensor capable of detecting biometric information.

At least one embodiment of the present disclosure provides a readout circuit capable of accurately detecting a sensing signal from a sensor.

According to an embodiment, a display device includes a display panel and a readout circuit. The display panel includes a pixel including a light emitting element, a sensor including a light sensing element, and a dummy sensor. The readout circuit outputs a readout signal based on a sensing signal received from the sensor and a dummy sensing signal received from the dummy sensor. The readout circuit includes a reference current conveyor that outputs a reference signal corresponding to the dummy sensing signal, and a sensing circuit that outputs the readout signal corresponding to a difference between the sensing signal and the reference signal.

In an embodiment, the sensing circuit may include a current conveyor that outputs a conveyor signal corresponding to the difference between the sensing signal and the reference signal, a current memory cell that stores the conveyor signal, and an analog-to-digital converter that outputs the readout signal by converting the conveyor signal from the current memory cell into a digital signal.

In an embodiment, the current memory cell may include a first memory cell that stores the conveyor signal corresponding to a difference between the sensing signal received during a first period, and the reference signal, and a second memory cell that stores the conveyor signal corresponding to a difference between the sensing signal received during a second period different from the first period, and the reference signal.

In an embodiment, the first memory cell may include a first capacitor that stores the conveyor signal during the first period, and a second capacitor that stores the conveyor signal during the first period.

In an embodiment, the second memory cell may include a third capacitor that stores the conveyor signal during the second period, and a fourth capacitor that stores the conveyor signal during the second period.

In an embodiment, the current memory cell may further include an amplifier including a first input terminal, a second input terminal, and an output node and receiving a reference voltage from the first input terminal, receiving the conveyor signal from the second input terminal, and outputting a current corresponding to the conveyor signal to the output node.

In an embodiment, the first memory cell may include a first transistor connected between a first voltage terminal and a first node and including a gate electrode connected to a second node, a first capacitor connected between the first voltage terminal and the second node, a first switching circuit that electrically connects an input node receiving the conveyor signal, and the second node in response to a first switching signal and delivers the conveyor signal to the second input terminal of the amplifier in response to a second switching signal, a second transistor connected between the first node and a second voltage terminal, and connected to a third node, a second capacitor connected between the third node and the second voltage terminal, and a second switching circuit that electrically connects the output node of the amplifier and the third node in response to the second switching signal.

In an embodiment, the second memory cell may include a third transistor connected between the first voltage terminal and a fourth node, and including a gate electrode connected to a fifth node, a third capacitor connected between the first voltage terminal and the fifth node, a third switching circuit that electrically connects the input node receiving the conveyor signal, and the fifth node in response to a third switching signal and delivers the conveyor signal to the second input terminal of the amplifier in response to a fourth switching signal, a fourth transistor connected between the fourth node and the second voltage terminal, and including a gate electrode connected to a sixth node, a fourth capacitor connected between the sixth node and the second voltage terminal, and a fourth switching circuit that electrically connects the output node of the amplifier and the sixth node in response to the fourth switching signal.

In an embodiment, the reference current conveyor may output a first reference voltage signal and a second reference voltage signal, which correspond to the dummy sensing signal.

In an embodiment, the current conveyor may include a first current mirror circuit that receives the sensing signal, the first reference voltage signal, the second reference voltage signal, a first bias voltage, and a second bias voltage to output a voltage signal, a buffer circuit that receives the first voltage signal and a reference voltage to output a first voltage and a second voltage, and a second current mirror circuit that receives the first voltage, the second voltage, the first bias voltage, and the second bias voltage to output the conveyor signal.

In an embodiment, the display panel may include a display area, in which the light emitting element and the sensor are disposed, and a non-display area in which the dummy sensor is disposed.

In an embodiment, the sensor may further include a sensor driving circuit connected to the light sensing element and outputting the sensing signal corresponding to external light.

In an embodiment, the sensor driving circuit may include a reset transistor including a first electrode for receiving a reset voltage, a second electrode connected to a first sensing node, and a gate electrode for receiving a reset signal, an amplification transistor including a first electrode for receiving a driving voltage, a second electrode connected to a second sensing node, and a gate electrode connected to the first sensing node, and an output transistor including a first electrode connected to the second sensing node, a second electrode connected to a readout line for outputting the sensing signal, and a gate electrode for receiving a scan signal.

In an embodiment, the dummy sensor may further include a sensor driving circuit connected to the light sensing element and outputting the dummy sensing signal corresponding to external light.

According to an embodiment, a readout circuit includes a reference current conveyor and a sensing circuit. The reference current conveyor outputs a reference signal corresponding to a dummy sensing signal from a dummy sensor. The sensing circuit outputs a readout signal corresponding to a difference between a sensing signal received from a sensor and the reference signal. The sensing circuit includes a current conveyor that outputs a conveyor signal corresponding to the difference between the sensing signal and the reference signal, a current memory cell that stores the conveyor signal, and an analog-to-digital converter that outputs the readout signal by converting the conveyer signal from the current memory cell into a digital signal.

In an embodiment, the current memory cell may include a first memory cell that stores the conveyor signal corresponding to a difference between the sensing signal received during a first period, and the reference signal, and a second memory cell that stores the conveyor signal corresponding to a difference between the sensing signal received during a second period different from the first period, and the reference signal.

In an embodiment, the first memory cell may include a first capacitor that stores the conveyor signal during the first period, and a second capacitor that stores the conveyor signal during the first period. The second memory cell may include a third capacitor that stores the conveyor signal during the second period, and a fourth capacitor that stores the conveyor signal during the second period.

In an embodiment, the current memory cell may further include an amplifier including a first input terminal, a second input terminal, and an output node and receiving a reference voltage from the first input terminal, receiving the conveyor signal from the second input terminal, and outputting a current corresponding to the conveyor signal to the output node.

In an embodiment, the first memory cell may include a first transistor connected between a first voltage terminal and a first node and including a gate electrode connected to a second node, a first capacitor connected between the first voltage terminal and the second node, a first switching circuit that electrically connects an input node receiving the conveyor signal, and the second node in response to a first switching signal and delivers the conveyor signal to the second input terminal of the amplifier in response to a second switching signal, a second transistor connected between the first node and a second voltage terminal, and connected to a third node, a second capacitor connected between the third node and the second voltage terminal, and a second switching circuit that electrically connects the output node of the amplifier and the third node in response to the second switching signal.

In an embodiment, the second memory cell may include a third transistor connected between the first voltage terminal and a fourth node, and including a gate electrode connected to a fifth node, a third capacitor connected between the first voltage terminal and the fifth node, a third switching circuit that electrically connects the input node receiving the conveyor signal, and the fifth node in response to a third switching signal and delivers the conveyor signal to the second input terminal of the amplifier in response to a fourth switching signal, a fourth transistor connected between the fourth node and the second voltage terminal, and including a gate electrode connected to a sixth node, a fourth capacitor connected between the sixth node and the second voltage terminal, and a fourth switching circuit that electrically connects the output node of the amplifier and the sixth node in response to the fourth switching signal.

BRIEF DESCRIPTION OF THE FIGURES

FIG. 3 is a block diagram of a display device, according to an embodiment of the present disclosure.

FIG. 14 is a circuit diagram of a buffer circuit and a second current mirror circuit in a current conveyor, according to an embodiment of the present disclosure.

DETAILED DESCRIPTION

Embodiments will now be described more fully hereinafter with reference to the accompanying drawings. Embodiments may, however, be provided in different forms and should not be construed as limiting. The same reference numbers may indicate the same components throughout the disclosure.

In the specification, the expression that a first component (or region, layer, part, etc.) is "on", "connected with", or "coupled with" a second component means that the first component is directly on, connected with, or coupled with the second component or means that a third component is interposed therebetween.

Hereinafter, embodiments of the present disclosure will be described with reference to accompanying drawings.

Figure 1:
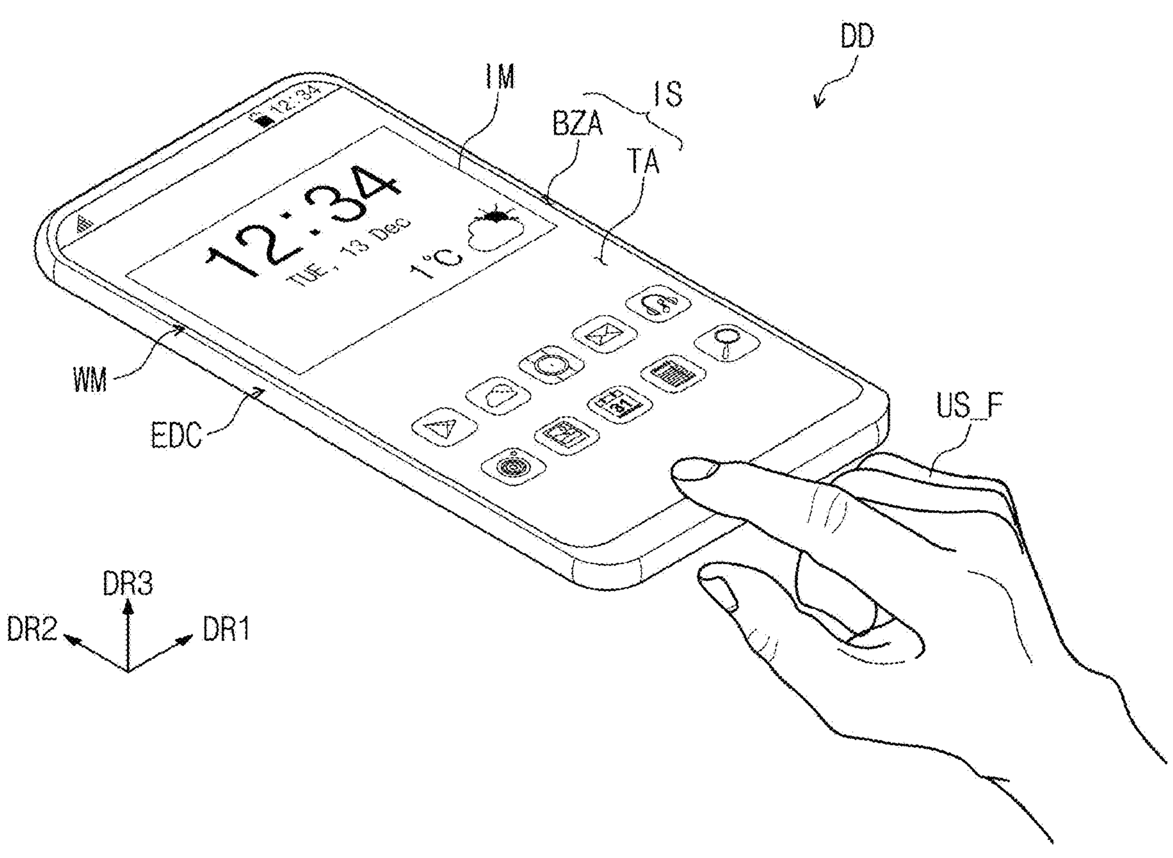
FIG. 1 is a perspective view of a display device, according to an embodiment of the present disclosure.
Figure 2:
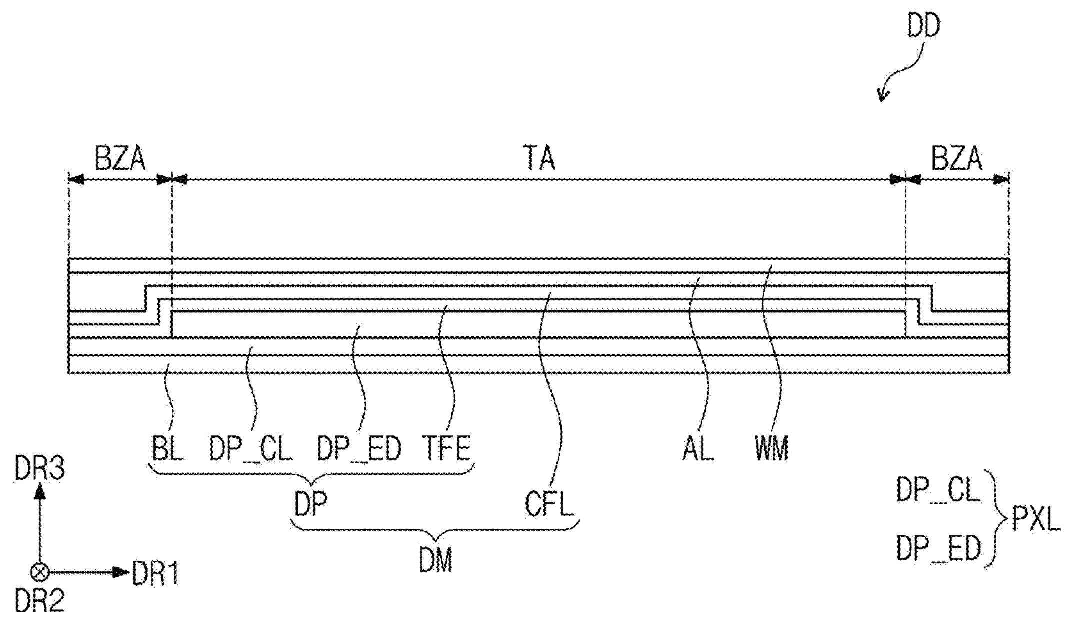
FIG. 2 is a cross-sectional view of a display device, according to an embodiment of the present disclosure.

FIG. 1 is a perspective view of a display device DD, according to an embodiment of the present disclosure. FIG. 2 is a cross-sectional view of the display device DD, according to an embodiment of the present disclosure.

Referring to FIGS. 1 and 2, the display device DD may be a device activated depending on an electrical signal. For example, the display device DD may be a mobile phone, a tablet PC, a car navigation system, a game console, or a wearable device, but is not limited thereto. FIG. 1 illustrates that the display device DD is a mobile phone.

In addition, although the rigid-type display device DD in a form of a bar is illustrated in FIG. 1, embodiments of the disclosure are not limited thereto. For example, the display device DD may be a foldable, rollable, or slidable display device DD.

A top surface of the display device DD may be defined as a display surface IS, and may have a plane defined by a first direction DR1 and a second direction DR2. Images IM generated by the display device DD may be provided to a user through the display surface IS. Hereinafter, a normal direction substantially perpendicular to a plane defined by the first direction DR1 and the second direction DR2 is defined as a third direction DR3. In the specification, the meaning of "when viewed from above a plane" may mean "when viewed in the third direction DR3". That is, the plane may be parallel to a plane defined by the first and second directions DR1 and DR2.

The display surface IS may be divided into a transmission area TA and a bezel area BZA. The transmission area TA may be an area in which the images IM are displayed. The user visually perceives the images IM through the transmission area TA. In an embodiment, the transmission area TA is illustrated in the shape of a quadrangle whose corners are rounded. However, this is illustrated as an example. For example, the transmission area TA may have various shapes and is not limited to any particular shape.

The bezel area BZA is adjacent to the transmission area TA. The bezel area BZA may have a predetermined color. The bezel area BZA may surround the transmission area TA. Accordingly, the shape of the transmission area TA may be substantially defined by the bezel area BZA. However, this is illustrated as an example. For example, the bezel area BZA may be disposed adjacent to only one side of the transmission area TA or may be omitted.

The display device DD may sense an external input applied from the outside. The external input may include various types of inputs that are provided from outside of the display device DD. For example, as well as a contact by a part of a body such as the user's hand US_F, the external input may include an external input (e.g., hovering) applied when the user's hand US_F approaches the display device DD or is adjacent to the display device DD within a predetermined distance. In addition, the external input may have various types such as force, pressure, temperature, light, and the like. The external input may be provided by a separate device, for example, an active pen or a digitizer pen. Moreover, the display device DD may detect the user's biometric information applied from the outside.

The display device DD may include a window WM and housing EDC. For example, the window WM and the housing EDC may be coupled to each other, and other components of the display device DD such as the display module DM may be accommodated therein.

A front surface of the window WM defines the display surface IS of the display device DD. The window WM may include an optically transparent insulating material. For example, the window WM may include glass or plastic. The window WM may include a multi-layer structure or a single layer structure. For example, the window WM may include a plurality of plastic films bonded to each other by an adhesive or may include a glass substrate and a plastic film bonded to each other by an adhesive.

The housing EDC may include a material having relatively high rigidity. For example, the housing EDC may include glass, plastic, or metal or may include a plurality of frames and/or plates that are composed of a combination thereof. The housing EDC may stably protect configurations of the display device DD accommodated in the inner space from an external impact. A battery module for supplying power for overall operations of the display device DD may be interposed between the display module DM and the housing EDC.

The display module DM may include a display panel DP and an anti-reflection layer CFL.

The display panel DP may generate an image. The display panel DP may be a light emitting display panel. For example, the display panel DP may be an organic light emitting display panel, an inorganic light emitting display panel, an organic-inorganic light emitting display panel, a quantum dot display panel, a micro-LED display panel, or a nano-LED display panel. Hereinafter, it is described that the display panel DP is an organic light emitting display panel.

The display panel DP includes a base layer BL, a pixel layer PXL, and an encapsulation layer TFE. The display panel DP according to an embodiment of the present disclosure is a flexible display panel. However, the present disclosure is not limited thereto. For example, the display panel DP may be a foldable display panel, which is folded with respect to a folding axis, or a rigid display panel.

The base layer BL may include a synthetic resin layer. The synthetic resin layer may be a polyimide-based resin layer, but the material thereof is not limited thereto. Besides, the base layer BL may include a glass substrate, a metal substrate, an organic/inorganic composite substrate, or the like.

The pixel layer PXL is disposed on the base layer BL. The pixel layer PXL may include a circuit layer DP_CL and an element layer DP_ED. The circuit layer DP_CL is interposed between the base layer BL and the element layer DP_ED.

The circuit layer DP_CL includes at least one insulating layer and a circuit element. Hereinafter, the insulating layer included in the circuit layer DP_CL is referred to as an "intermediate insulating layer". In an embodiment, the intermediate insulating layer includes at least one intermediate inorganic film and at least one intermediate organic film. The circuit element may include a pixel driving circuit, which is included in each of a plurality of pixels for displaying an image, and a sensor driving circuit, which is included in each of a plurality of sensors for recognizing external information. The circuit layer DP_CL may further include signal lines connected to the pixel driving circuit and/or the sensor driving circuit.

As an example of the present disclosure, each of the plurality of sensors may be a fingerprint recognition sensor, a proximity sensor, or an iris recognition sensor. Furthermore, each of the plurality of sensors may be an optical sensor that recognizes the biometric information in an optical scheme. According to an embodiment of the present disclosure, an external input (e.g., a user's touch) as well as biometric information such as a fingerprint may be sensed by using the plurality of sensors. Accordingly, the display device DD need not include a separate input sensing layer for sensing an external input. In this case, the thickness of the display device DD may be further reduced. As a result, flexibility may be increased, and thus the display device DD may be implemented in various types. For example, the display device DD may be implemented as a foldable, rollable, or slidable display device described above.

The element layer DP_ED may include a light emitting element included in each of the pixels and a light sensing element included in each of the sensors. As an example of the present disclosure, the light sensing element may be a photodiode. The light sensing element may be a sensor that detects or responds to light reflected by a user's fingerprint. The circuit layer DP_CL and the element layer DP_ED will be described in detail later with reference to FIG. 9.

The encapsulation layer TFE encapsulates the element layer DP_ED. In an embodiment, the encapsulation layer TFE includes at least one organic film and at least one inorganic film. The inorganic film may include inorganic materials and may protect the element layer DP_ED from moisture/oxygen. The inorganic film may include a silicon nitride layer, a silicon oxynitride layer, a silicon oxide layer, a titanium oxide layer, or an aluminum oxide layer, but is not limited thereto. The organic film may include organic materials and may protect the element layer DP_ED from foreign objects such as dust particles.

The anti-reflection layer CFL may be disposed on the display panel DP. The anti-reflection layer CFL may reduce the reflectance of external light incident from outside of the display device DD. The anti-reflection layer CFL may be formed on the input display panel DP through sequential processes, but the present disclosure is not limited thereto. For example, the anti-reflection layer CFL may include color filters, a black matrix, and a planarization layer. The color filters may have a given arrangement. For example, the color filters may be arranged in consideration of emission colors of pixels included in the display panel DP. In an embodiment, the anti-reflection layer CFL includes a black matrix and a reflection adjustment layer. The reflection adjustment layer may selectively absorb light in a partial band among light reflected from inside the display panel DP and/or an electronic device or incident light from outside of the display panel DP and/or the electronic device. In an embodiment, the anti-reflection layer CFL is a polarizing film.

The display device DD according to an embodiment of the present disclosure further includes an adhesive layer AL. The window WM may be attached to the anti-reflection layer CFL by the adhesive layer AL. The adhesive layer AL may include an optical clear adhesive, an optically clear adhesive resin, or a pressure sensitive adhesive (PSA).

Figure 3:
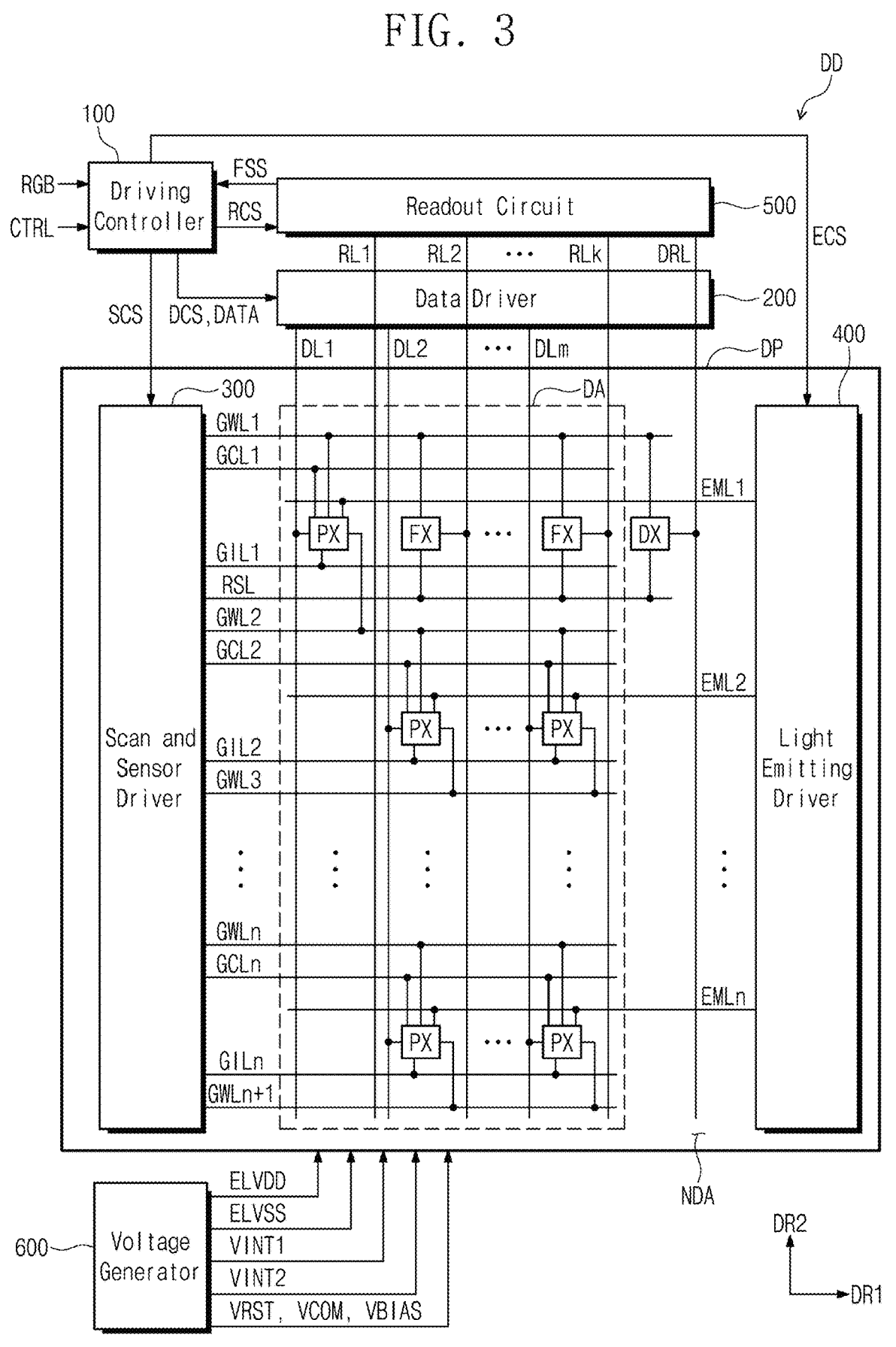

FIG. 3 is a block diagram of a display device, according to an embodiment of the present disclosure.

Referring to FIG. 3, the display device DD includes the display panel DP, a driving controller 100 (e.g., a controller circuit), a data driver 200 (e.g., a first driver circuit), a scan and sensor driver 300 (e.g., a second driver circuit), a light emitting driver 400 (e.g., a third driver circuit), a readout circuit 500, and a voltage generator 600.

The driving controller 100 receives an input image signal RGB and a control signal CTRL. The driving controller 100 generates an output image signal DATA by converting a data format of the input image signal RGB so as to be suitable for the display panel DP and the data driver 200. The driving controller 100 outputs a scan control signal SCS, a data control signal DCS, an emission control signal ECS, and a readout control signal RCS.

The data driver 200 receives the data control signal DCS and the output image signal DATA from the driving controller 100. The data driver 200 converts the output image signal DATA into data signals and outputs the data signals to a plurality of data lines DL1 to DLm. The data signals may be analog voltages corresponding to a grayscale level of the output image signal DATA.

The voltage generator 600 generates voltages to operate the display panel DP. In an embodiment, the voltage generator 600 generates a first driving voltage ELVDD, a second driving voltage ELVSS, a first initialization voltage VINT1, a second initialization voltage VINT2, a reset voltage VRST, a sensor driving voltage VCOM, and a bias voltage VBIAS.

The display panel DP includes scan lines GIL1 to GILn, GCL1 to GCLn, and GWL1 to GWLn+1, a reset lines RSL, emission lines EML1 to EMLn, data lines DL1 to DLm, readout lines RL1 to RLk, pixels PX, sensors FX, and a dummy sensor DX.

The display panel DP may include a display area DA corresponding to the transmission area TA (refer to FIG. 1) and a non-display area NDA corresponding to the bezel area BZA (shown in FIG. 1). The pixels PX and sensors FX may be disposed in the display area DA.

The scan and sensor driver 300, the light emitting driver 400, and the dummy sensor DX may be positioned in the non-display area NDA of the display panel DP.

In an embodiment, the scan and sensor driver 300 is disposed adjacent to a first side of the display area DA in the display panel DP. The scan and sensor driver 300 receives the scan control signal SCS from the driving controller 100. The scan and sensor driver 300 may output scan signals as the scan lines GIL1 to GILn, GCL1 to GCLn, and GWL1 to GWLn+1 in response to the scan control signal SCS and may output a reset signal to the reset line RSL. The scan lines GIL1 to GILn, GCL1 to GCLn, and GWL1 to GWLn+1 and the reset line RSL extend from the scan and sensor driver 300 in the first direction DR1.

The light emitting driver 400 is disposed adjacent to a second side of the display area DA in the display panel DP. The light emitting driver 400 receives the emission control signal ECS from the driving controller 100. The light emitting driver 400 may output emission signals to the emission lines EML1 to EMLn in response to the emission control signal ECS. The emission lines EML1 to EMLn may extend from the light emitting driver 400 in a direction opposite to the first direction DR1.

The scan lines GIL1 to GILn, GCL1 to GCLn, and GWL1 to GWLn, the reset lines RSL, and the emission lines EML1 to EMLn may be arranged spaced from one another in the second direction DR2. The data lines DL1 to DLm may extend from the data driver 200 in a direction opposite to the second direction DR2, and may be arranged spaced from one another in the first direction DR1.

The plurality of pixels PX are electrically connected to the scan lines GIL1 to GILn, GCL1 to GCLn, and GWL1 to GWLn+1, the emission lines EML1 to EMLn, and the data lines DL1 to DLm. In an embodiment, each of the plurality of pixels PX is electrically connected to four scan lines and one emission line. For example, as shown in FIG. 3, a first row of pixels may be connected to the scan lines GIL1, GCL1, GWL1, and GWL2 and the emission line EML1. Moreover, a second row of pixels may be connected to the scan lines GIL2, GCL2, GWL2, and GWL3 and the emission line EML2.

Each of the plurality of pixels PX includes a light emitting element ED (refer to FIG. 5) and a pixel driving circuit PDC (refer to FIG. 5) for controlling the emission of the light emitting element ED. The pixel driving circuit PDC may include one or more transistors and one or more capacitors. The scan and sensor driver 300 and the light emitting driver 400 may include transistors formed through the same process as the pixel driving circuit PDC.

Each of the plurality of pixels PX receives the first driving voltage ELVDD, the second driving voltage ELVSS, the first initialization voltage VINT1, and the second initialization voltage VINT2 from the voltage generator 600.

Figure 7A:
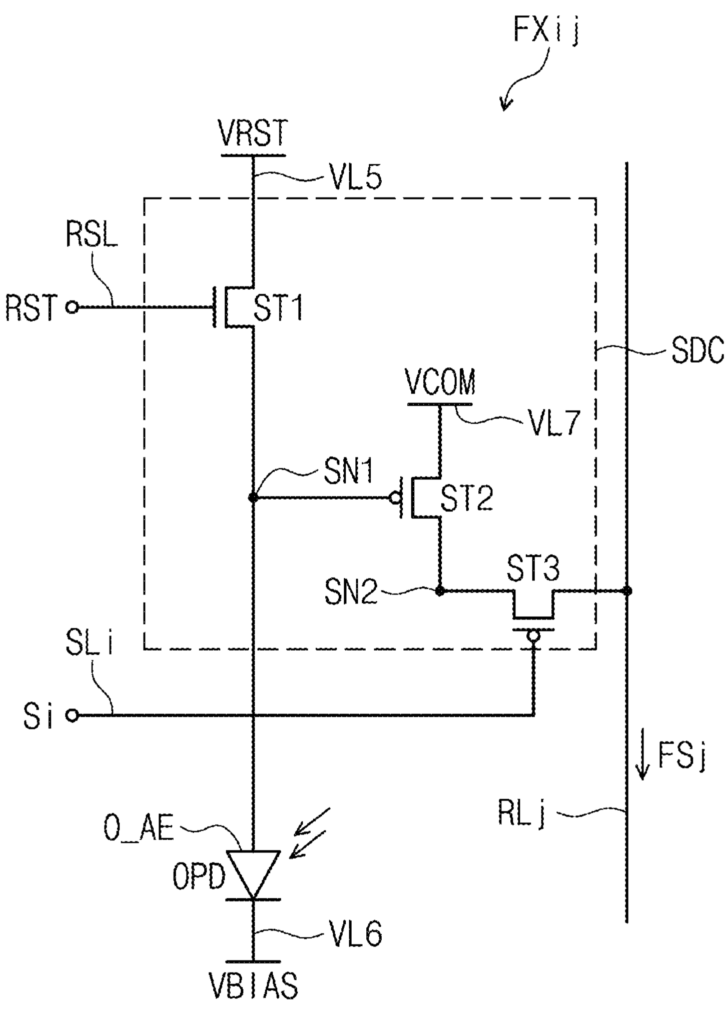
FIG. 7A is a circuit diagram of a sensor, according to an embodiment of the present disclosure.

Each of the sensors FX includes a light sensing element OPD (refer to FIG. 7A) and a sensor driving circuit SDC (refer to FIG. 7A). The sensor driving circuit SDC may include transistors formed through the same process as the pixel driving circuit PDC.

Each of the sensors FX may be connected to one corresponding scan line among the scan lines GWL1 to GWLn and one corresponding readout line among the readout lines RL1 to RLk. The sensors FX may be connected to the reset line RSL in common. In an embodiment, the number of sensors FX is less than the number of pixels PX. However, the present disclosure is not limited thereto. In an embodiment, the number of sensors FX disposed on the display panel DP is greater than or equal to the number of pixels PX. In an embodiment, the number of readout lines RL1 to RLk is less than the number of data lines DL1 to DLm. That is, $k<m$. However, the present disclosure is not limited thereto. In an embodiment, the number of readout lines RL1 to RLk disposed on the display panel DP is greater than or equal to the number of data lines DL1 to DLm.

The dummy sensor DX may be connected to one corresponding scan line (e.g., the scan line GWL1) among the scan lines GWL1 to GWLn and a dummy readout line DRL.

Although one dummy sensor DX is shown in FIG. 3, the display device DD may include a plurality of dummy sensors DX. FIG. 3 shows that the dummy sensor DX is interposed between the display area DA and the light emitting driver 400, but the present disclosure is not limited thereto. The dummy sensor DX may be positioned at any location in the non-display area NDA of the display panel DP. For example, the dummy sensor DX may be disposed between the display area DA and the scan and sensor driver 300, or between the display area DA and the data driver 200.

The readout circuit 500 receives a readout control signal RCS from the driving controller 100. The readout circuit 500 may receive a sensing signal from the readout lines RL1 to RLk in response to the readout control signal RCS, generate a readout signal FSS from the sensing signal, and then may provide the readout signal FSS to the driving controller 100.

In an embodiment, the sensors FX and the readout circuit 500 operate in a biometric sensing mode, in which biometric information such as a user's fingerprint or blood pressure is sensed, and a touch sensing mode in which the user's touch input is sensed. In the biometric sensing mode, the readout signal FSS provided from the readout circuit 500 to the driving controller 100 may be a sensing signal corresponding to the user's biometric information (blood pressure, fingerprint, or the like). In the touch sensing mode, the readout signal FSS provided from the readout circuit 500 to the driving controller 100 may be a signal indicating a user's touch location.

In the example shown in FIG. 3, the scan and sensor driver 300 is arranged to face the light emitting driver 400 with the pixels PX interposed therebetween, but the present disclosure is not limited thereto. For example, the scan and sensor driver 300 and the light emitting driver 400 may be positioned side by side to be adjacent to one of the first side surface and the second side surface of the display area DA in the display panel DP. In an embodiment, the scan and sensor driver 300 and the light emitting driver 400 are integrated into a single circuit.

Figure 4:
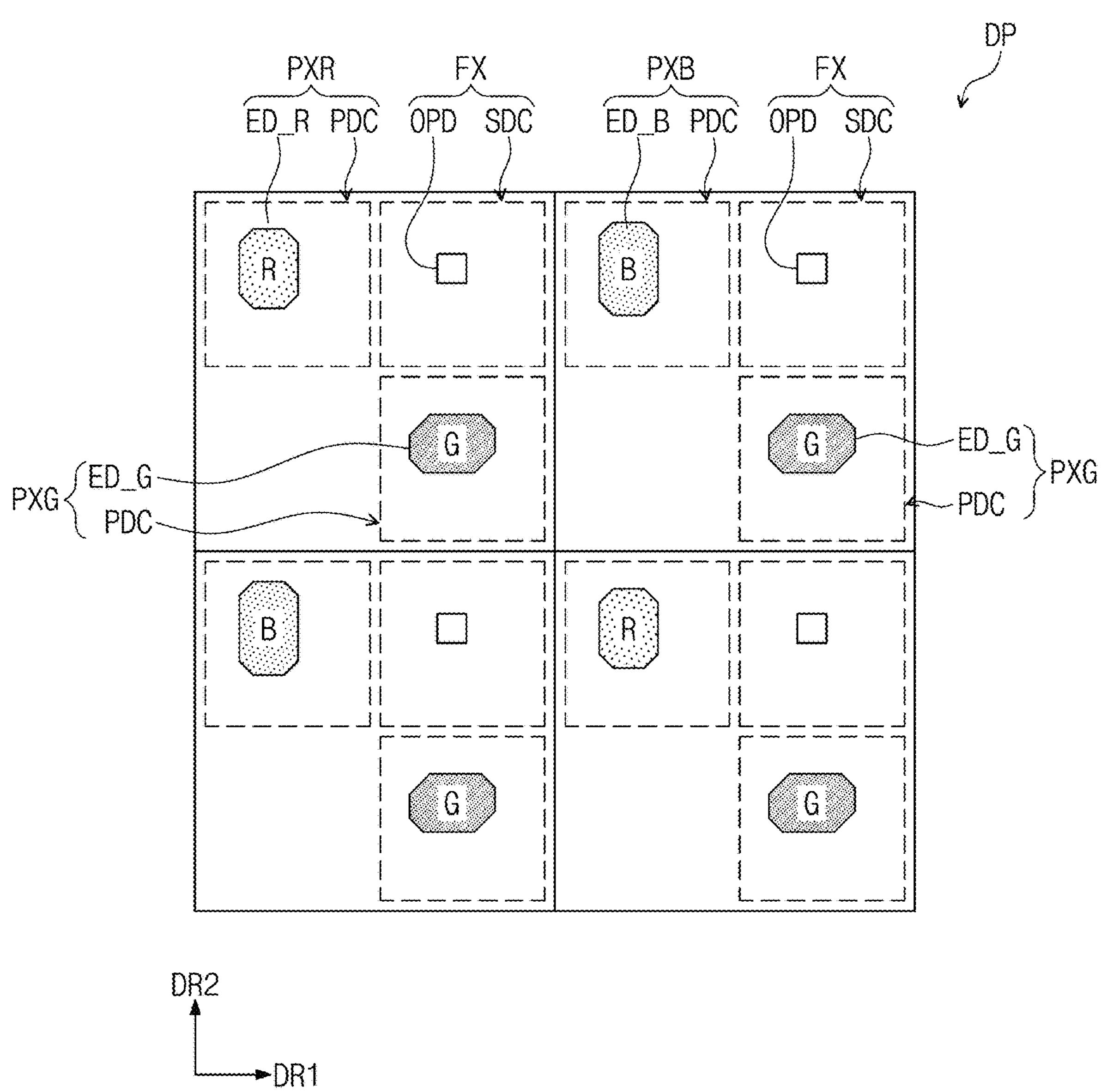
FIG. 4 is an enlarged plan view of a partial area of a display panel, according to an embodiment of the present disclosure.

FIG. 4 is an enlarged plan view of a partial area of the display panel DP of FIG. 3, according to an embodiment of the present disclosure.

Referring to FIG. 4, pixels PXR, PXG, and PXB are positioned on the display panel DP. The pixel PXR includes a light emitting element ED_R and a first pixel driving circuit PDC; the pixel PXG includes a light emitting element ED_G and a second pixel driving circuit PDC; and, the pixel PXB includes a light emitting element ED_B and a third pixel driving circuit PDC. Each of the sensors FX includes the light sensing element OPD and a sensor driving circuit SDC.

Referring to FIG. 4, the pixels PXR and PXB and the sensors FX are disposed in odd-numbered rows, that is, a first row and a third row. In an embodiment, in the first row and the third row, the pixels PXR and PXB and the sensors FX are alternately disposed in the first direction DR1. Only the pixels PXG are positioned in the second row.

In an embodiment, the pixel PXR includes the light emitting element ED_R that emits light of a first color (e.g., red). The pixel PXG may include the light emitting element ED_G that emits light of a second color (e.g., green). The pixel PXB may include the light emitting element ED_B that emits light of a third color (e.g., blue).

As shown in FIG. 4, the pixels PXR and PXB may be alternately and repeatedly positioned in the second direction DR2 as well as the first direction DR1. Each of the second pixels PXG may be arranged between the two light sensing elements OPD in the second direction DR2.

The arrangement structure of the pixels PX and the sensors FX is not limited to that of FIG. 4 and may be variously changed.

In an embodiment, the light emitting element ED_R has a larger size than the light emitting element ED_G. Furthermore, the light emitting element ED_B may have a size larger than or equal to the light emitting element ED_R. The size of each of the light emitting elements ED_R, ED_G, and ED_B is not limited thereto, and may be variously modified and applied. For example, in an embodiment of the present disclosure, the light emitting elements ED_R, ED_G, and ED_B may have the same size as one another.

Besides, the shape of each of the light emitting elements ED_R, ED_G, and ED_B may be variously transformed into a polygon, a circle, an ellipse, and the like. In an embodiment, the shapes of the light emitting elements ED_R, ED_G, and ED_B are different from one another. For example, the light emitting element ED_G may have a circular shape, and each of the light emitting elements ED_R and ED_B may have a quadrangle shape.

In an embodiment, an area size occupied by the sensor driving circuit SDC is different from an area size occupied by the pixel driving circuit PDC.

Figure 5:
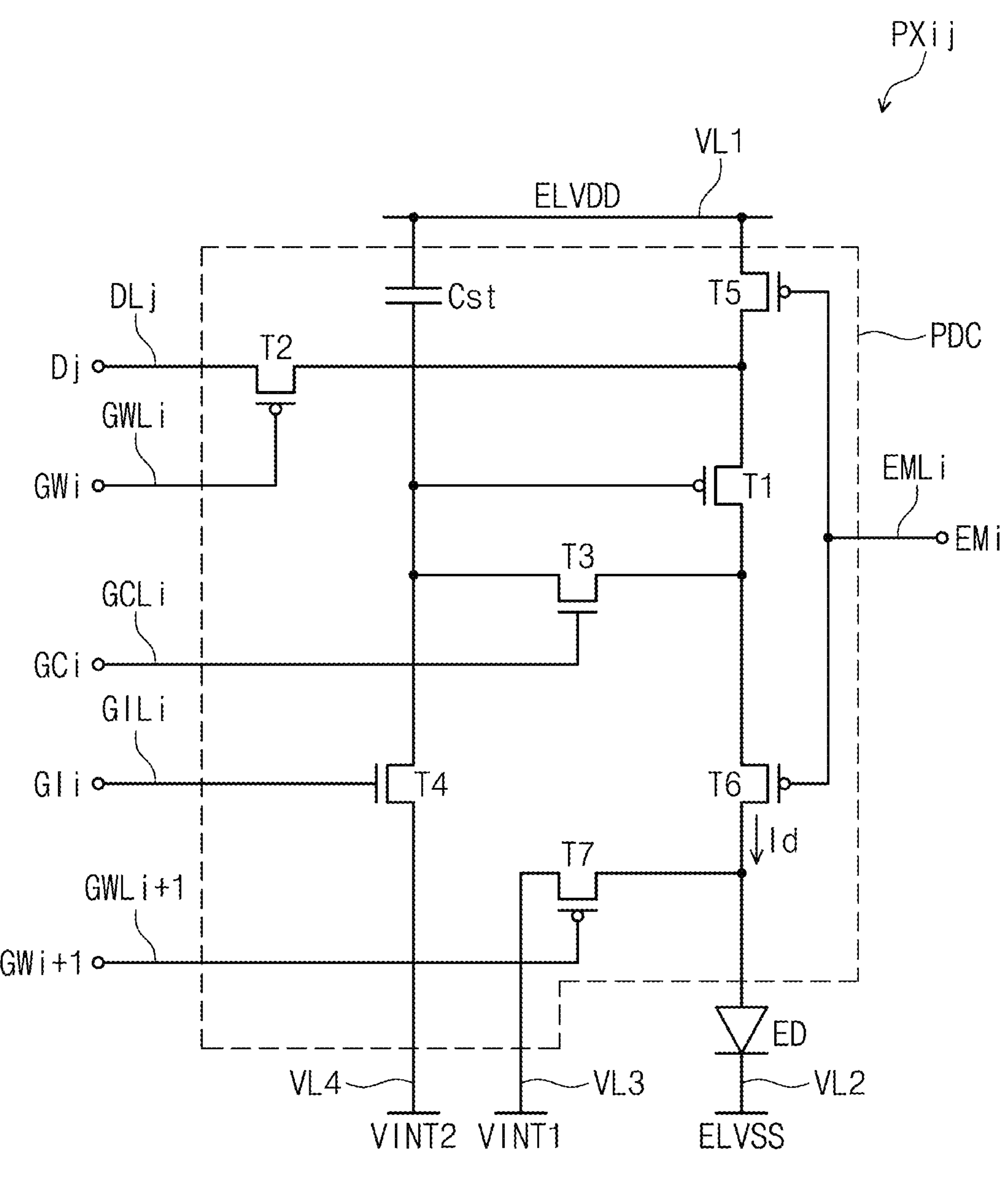
FIG. 5 is a circuit diagram of a pixel of the display panel, according to an embodiment of the present disclosure.

FIG. 5 is a circuit diagram of a pixel of the display panel DP, according to an embodiment of the present disclosure.

FIG. 5 illustrates one pixel PXij among the pixels PX illustrated in FIG. 3. Each of the plurality of pixels PX shown in FIG. 3 may have the same circuit configuration as the pixel PXij shown in FIG. 5.

Referring to FIG. 5, the pixel PXij includes the pixel driving circuit PDC and the at least one light emitting element ED. The light emitting element ED may be a light emitting diode. As an example of the present disclosure, the light emitting element ED may be an organic light emitting diode including an organic light emitting layer. The pixel driving circuit PDC according to an embodiment includes first to seventh transistors T1, T2, T3, T4, T5, T6, and T7 and one capacitor Cst.

The third and fourth transistors T3 and T4 among the first to seventh transistors T1 to T7 may be N-type transistors that use an oxide semiconductor as a semiconductor layer. Each of the first, second, fifth, sixth, and seventh transistors T1, T2, T5, T6, and T7 may be P-type transistors that have a low-temperature polycrystalline silicon (LTPS) semiconductor layer. However, the present disclosure is not limited thereto. In an embodiment, all the first to seventh transistors T1 to T7 are P-type transistors. In an embodiment, all the first to seventh transistors T1 to T7 are N-type transistors. In an embodiment, at least one of the first to seventh transistors T1 to T7 is an N-type transistor and the others thereof are P-type transistors. A configuration of the pixel driving circuit PDC according to an embodiment of the present disclosure is not limited to an embodiment illustrated in FIG. 5. The pixel driving circuit PDC illustrated in FIG. 5 is only an example. For example, the configuration of the pixel driving circuit PDC may be variously modified and implemented.

The pixel PXij is electrically connected to the scan lines GILi, GCLi, GWLi, and GWLi+1, the emission line EMLi, and the data line DLj. The scan lines GILi, GCLi, GWLi, and GWLi+1 may deliver scan signals Gli, GCi, GWi, and GWi+1, respectively. The emission line EMLi may deliver an emission signal EMi. The data line DLj delivers a data signal Dj. The data signal Dj may have a voltage level corresponding to the input image signal RGB that is input to the display device DD (refer to FIG. 3). First to fourth driving voltage lines VL1, VL2, VL3, and VL4 may transfer the first driving voltage ELVDD, the second driving voltage ELVSS, the first initialization voltage VINT1, and the second initialization voltage VINT2, respectively.

The first transistor T1 includes a first electrode connected with the first driving voltage line VL1 through the fifth transistor T5, a second electrode electrically connected with an anode of the light emitting element ED through the sixth transistor T6, and a gate electrode connected with one end of the capacitor Cst. The first transistor T1 may receive the data signal Dj delivered through the data line DLj depending on the switching operation of the second transistor T2 and then may supply a driving current Id to the light emitting element ED.

The second transistor T2 includes a first electrode connected to the data line DLj, a second electrode connected to the first electrode of the first transistor T1, and a gate electrode connected to the scan line GWLi. The second transistor T2 may be turned on in response to the scan signal GWi transferred through the scan line GWLi and may transfer the data signal Dj transferred through the data line DLj to the first electrode of the first transistor T1. For example, the scan signal GWi may be applied to a gate terminal of the second transistor T2.

The third transistor T3 includes a first electrode connected with the gate electrode of the first transistor T1, a second electrode connected with the second electrode of the first transistor T1, and a gate electrode connected with the scan line GCLi. The third transistor T3 may be turned on in response to the scan signal GCi transferred through the scan line GCLi, and thus, the gate electrode and the second electrode of the first transistor T1 may be connected, that is, the first transistor T1 may be diode-connected. For example, the scan signal GCi may be applied to a gate terminal of the third transistor T3.

The fourth transistor T4 includes a first electrode connected with the gate electrode of the first transistor T1, a second electrode connected with the fourth driving voltage line VL4 through which the second initialization voltage VINT2 is transferred, and a gate electrode connected with the scan line GILi. The fourth transistor T4 may be turned on in response to the scan signal Gli transferred through the scan line GILi such that the second initialization voltage VINT2 is transferred to the gate electrode of the first transistor T1. For example, the scan signal Gli may be applied to a gate terminal of the fourth transistor T4. Accordingly, an initialization operation of initializing a voltage of the gate electrode of the first transistor T1 may be performed.

The fifth transistor T5 includes a first electrode connected to the first driving voltage line VL1, a second electrode connected to the first electrode of the first transistor T1, and a gate electrode connected to the emission line EMLi.

The sixth transistor T6 includes a first electrode connected to the second electrode of the first transistor T1, a second electrode connected with the anode of the light emitting element ED, and a gate electrode connected to the emission line EMLi.

The fifth transistor T5 and the sixth transistor T6 may be simultaneously turned on in response to the emission control signal EMi transferred through the emission line EMLi. As such, the first driving voltage ELVDD may be compensated through the diode-connected transistor T1 so as to be supplied to the light emitting element ED. For example, the emission control signal EMi may be applied to gate terminals of the fifth transistor T5 and the sixth transistor T6.

The seventh transistor T7 includes a first electrode connected to the anode of the light emitting element ED, a second electrode connected to the third driving voltage line VL3, and a gate electrode connected to the scan line GWLi+1. The seventh transistor T7 is turned on in response to the scan signal GWi+1 received through the scan line GWLi+1 to electrically connect the anode of the light emitting element ED and the third driving voltage line VL3. For example, the scan signal GWi+1 may be applied to a gate terminal of the seventh transistor T7.

One end of the capacitor Cst is connected to the gate electrode of the first transistor T1, and the other end of the capacitor Cst is connected to the first driving voltage line VL1. A cathode of the light emitting element ED may be connected with the second driving voltage line VL2 that transfers the second driving voltage ELVSS. The structure of the pixel PXij according to an embodiment is not limited to the structure illustrated in FIG. 5. For example, the number of transistors included in the one pixel PXij, the number of capacitors included in the pixel PXij, and the connection relationship between the transistors and the capacitors may be variously modified.

Figure 6:
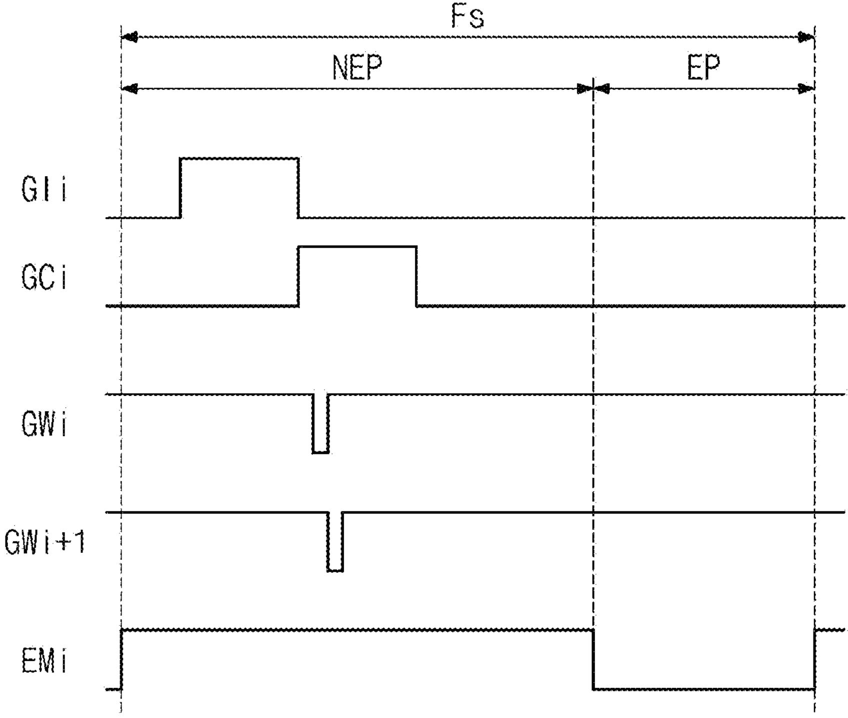
FIG. 6 is a timing diagram for an operation of a pixel illustrated in FIG. 5.

FIG. 6 is a timing diagram for describing an operation of a pixel illustrated in FIG. 5.

Referring to FIGS. 5 and 6, one frame Fs (or frame period) may include an emission period EP and a non-emission period NEP. The emission period EP may correspond to a low-level period (i.e., an active period) of the emission control signal EMi. The non-emission period NEP may correspond to a high-level period (i.e., an inactive period) of the emission control signal EMi.

The non-emission period NEP may include an initialization period and a data programming and compensation period.

When the scan signal Gli having a high level is provided through the scan line GILi during the initialization period, the fourth transistor T4 is turned on. The second initialization voltage VINT2 is delivered to the gate electrode of the first transistor T1 through the fourth transistor T4 so as to initialize the first transistor T1.

Next, when the scan signal GCi having a high level is supplied through the scan line GCLi during the data programming and compensation period, the third transistor T3 is turned on. The first transistor T1 is diode-connected by the third transistor T3 thus turned on to be forward-biased. At this time, when the scan signal GWi having a low level is supplied through the scan line GWLi, the second transistor T2 is turned on. In the case, a compensation voltage, which is obtained by reducing the voltage of the data signal Dj supplied from the data line DLj by a threshold voltage of the first transistor T1, is applied to the gate electrode of the first transistor T1. That is, a gate voltage applied to the gate electrode of the first transistor T1 may be a compensation voltage.

When the first driving voltage ELVDD and the compensation voltage are respectively applied to opposite ends of the capacitor Cst, charges corresponding to a difference between the first driving voltage ELVDD and the compensation voltage may be stored in the capacitor Cst.

In the meantime, the seventh transistor T7 is turned on in response to the scan signal GWi+1 having a low level that is delivered through the scan line GWLi+1. When the seventh transistor T7 is turned on, the anode of the light emitting element ED is electrically connected to the third driving voltage line VL3. Accordingly, the anode of the light emitting element ED may be initialized to the first initialization voltage VINT1.

Next, during the emission period EP, the emission control signal EMi supplied from the emission line EMLi is changed from a high level to a low level. During the emission period EP, the fifth transistor T5 and the sixth transistor T6 are turned on by the emission control signal EMi having a low level. In this case, the driving current Id according to a voltage difference between the gate voltage of the gate electrode of the first transistor T1 and the first driving voltage ELVDD is generated and supplied to the light emitting element ED through the sixth transistor T6, and the driving current Id flows through the light emitting element ED. The light emitting element ED may emit light with luminance corresponding to the driving current Id.

FIG. 7A is a circuit diagram of a sensor FX of FIG. 3, according to an embodiment of the present disclosure.

FIG. 7A shows one sensor FXij among the plurality of sensors FX shown in FIG. 3. Each of the plurality of sensors FX shown in FIG. 3 may have the same circuit configuration as the sensor FXij shown in FIG. 7A.

The sensor FXij is electrically connected to a sensor scan line SLi, a reset line RSL, and a readout line RLj.

The sensor FXij includes the light sensing element OPD and the sensor driving circuit SDC. The light sensing element OPD may be a photodiode. As an example of the present disclosure, the light sensing element OPD may be an organic photodiode including an organic material as a photoelectric conversion layer. A light sensing anode O_AE of the light sensing element OPD may be connected with a first sensing node SN1, and a cathode thereof may be connected with a sixth driving voltage line VL6 transferring the bias voltage VBIAS. In an embodiment, the bias voltage VBIAS is the same voltage as the second driving voltage ELVSS provided to the cathode of the light emitting element ED shown in FIG. 5.

The sensor driving circuit SDC includes three transistors ST1 to ST3. The three transistors ST1 to ST3 may include the reset transistor ST1, the amplification transistor ST2, and the output transistor ST3. Some of the reset transistor ST1, the amplification transistor ST2, and the output transistor ST3 may be P-type transistors, and the other(s) thereof may be an N-type transistor. In an embodiment, the reset transistor ST1 is the same N-type transistor as the third transistor T3 of the pixel PXij shown in FIG. 5, and each of the amplification transistor ST2 and the output transistor ST3 is the same P-type transistor as the first and second transistors T1 and T2 of the pixel PXij shown in FIG. 5. However, the present disclosure is not limited thereto. In an embodiment, all of the reset transistor ST1, the amplification transistor ST2, and the output transistor ST3 are P-type transistors. In an embodiment, all of the reset transistor ST1, the amplification transistor ST2, and the output transistor ST3 are N-type transistors.

The reset transistor ST1 includes a first electrode connected with a reset voltage line VL5 that receives a reset voltage VRST, a second electrode connected with the first sensing node SN1, and a gate electrode connected with the reset line RSL that receives the reset signal RST. The reset transistor ST1 may reset a potential of the first sensing node SN1 to the reset voltage VRST in response to the reset signal RST. In an embodiment, the reset voltage VRST has a voltage level lower than the bias voltage VBIAS.

The amplification transistor ST2 includes a first electrode connected with a seventh driving voltage line VL7 receiving the sensor driving voltage VCOM, a second electrode connected with a second sensing node SN2, and a gate electrode connected with the first sensing node SN1. In an embodiment, the sensor driving voltage VCOM has the same voltage level as one of the first driving voltage ELVDD, the first initialization voltage VINT1, or the second initialization voltage VINT2 that are provided to the pixel PXij shown in FIG. 5. The amplification transistor ST2 may provide a current corresponding to a potential of the first sensing node SN1 to the second sensing node SN2.

The output transistor ST3 includes a first electrode connected with the second sensing node SN2, a second electrode connected with the readout line RLj, and a gate electrode connected with the sensor scan line SLi receiving the sensor scan signal Si. The output transistor ST3 may output a sensing signal FSj to the readout line RLj in response to the sensor scan signal Si.

The circuit configuration of the sensor driving circuit SDC according to an embodiment of the present disclosure is not limited to that illustrated in FIG. 7A. The sensor driving circuit SDC illustrated in FIG. 7A is merely an example, and the configuration of the sensor driving circuit SDC may be variously modified and implemented.

Figure 7B:
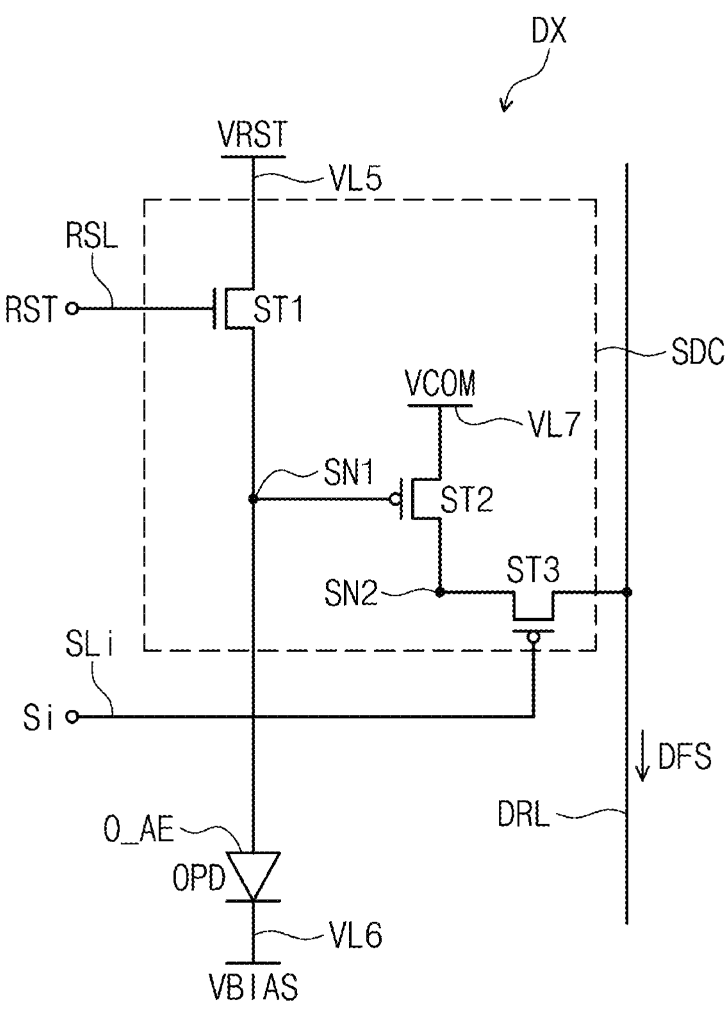
FIG. 7B is a circuit diagram of a dummy sensor, according to an embodiment of the present disclosure.

FIG. 7B is a circuit diagram of the dummy sensor DX, according to an embodiment of the present disclosure.

The dummy sensor shown in FIG. 7B may have the same circuit configuration as the sensor FXij shown in FIG. 7A. The same reference numerals are used for circuit components, which are the same as those of the sensor FXij, from among circuit components of the dummy sensor DX shown in FIG. 7B, and additional descriptions are omitted to avoid redundancy.

The dummy sensor DX is electrically connected to the sensor scan line SLi, the reset line RSL and a dummy readout line DRL. In an embodiment, the sensor scan line SLi may be the scan line GWL1 shown in FIG. 3. The dummy sensor DX outputs a dummy sensing signal DFS to the dummy readout line DRL. The dummy readout line DRL is a line different from any of the readout lines (e.g., RL1-RLk).

Figure 8:
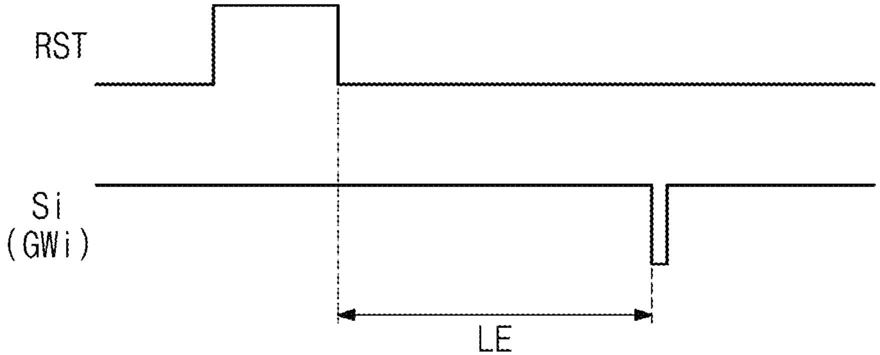
FIG. 8 is a timing diagram for an operation of the sensor shown in FIG. 7A.

FIG. 8 is a timing diagram for describing an operation of the sensor FXij shown in FIG. 7A.

Referring to FIGS. 7A and 8, when the reset signal RST transitions to a high level, the reset transistor ST1 is turned on. When the reset transistor ST1 is turned on, the first sensing node SN1 may be initialized to the reset voltage VRST.

After the reset signal RST transitions to a low level, the sensor FXij is exposed to light during a light exposure period LE. When a user's hand touches a display surface of the display panel DP, the light sensing element OPD may generate photocharges corresponding to light reflected by the user's hand, and the generated photocharges may be accumulated in the first sensing node SN1.

The amplification transistor ST2 may be a source follower amplifier that generates a source-drain current in proportion to a charge amount of the first sensing node SN1 input to the gate electrode of the amplification transistor ST2.

While the sensor scan signal Si is at an inactive level (i.e., a high level), the output transistor ST3 is turned off. When the sensor scan signal Si transitions to an active level (i.e., a low level), the output transistor ST3 is turned on. When the output transistor ST3 is turned on, a sensing signal FSj corresponding to a current flowing through the amplification transistor ST2 may be output to the readout line RLj.

In an embodiment, the sensor scan signal Si is the same signal as the scan signal GWi shown in FIGS. 5 and 6. That is, the pixels PXij and the sensors FXij positioned in the i-th row may receive the same scan signal GWi.

In an embodiment, during a biometric sensing mode (e.g., a fingerprint sensing mode), the light sensing element OPD may generate photocharges corresponding to light reflected by a ridge of a fingerprint or a valley between ridges of the fingerprint. During the fingerprint sensing mode, the sensing signal FSj output from the sensor FXij may be a signal corresponding to the user's fingerprint.

In an embodiment, in the biometric sensing mode (e.g., a blood pressure sensing mode), the light sensing element OPD may generate photocharges corresponding to light reflected from blood vessels located under a dermal layer of the user's skin. During cardiac systole, blood moves to the periphery, thereby increasing arterial blood volume. On the other hand, during cardiac diastole, thereby decreasing arterial blood volume. This change in blood volume changes the reflected light. During a blood pressure measurement mode, the sensing signal FSj output from the sensor FXij may be a signal corresponding to the user's blood pressure.

In an embodiment, in a touch sensing mode, the light sensing element OPD may generate photocharges corresponding to light reflected by the user's touch. The sensing signal FSj output from the sensor FXij during the touch sensing mode may be a signal indicating whether a user performs a touch operation.

Figure 9:
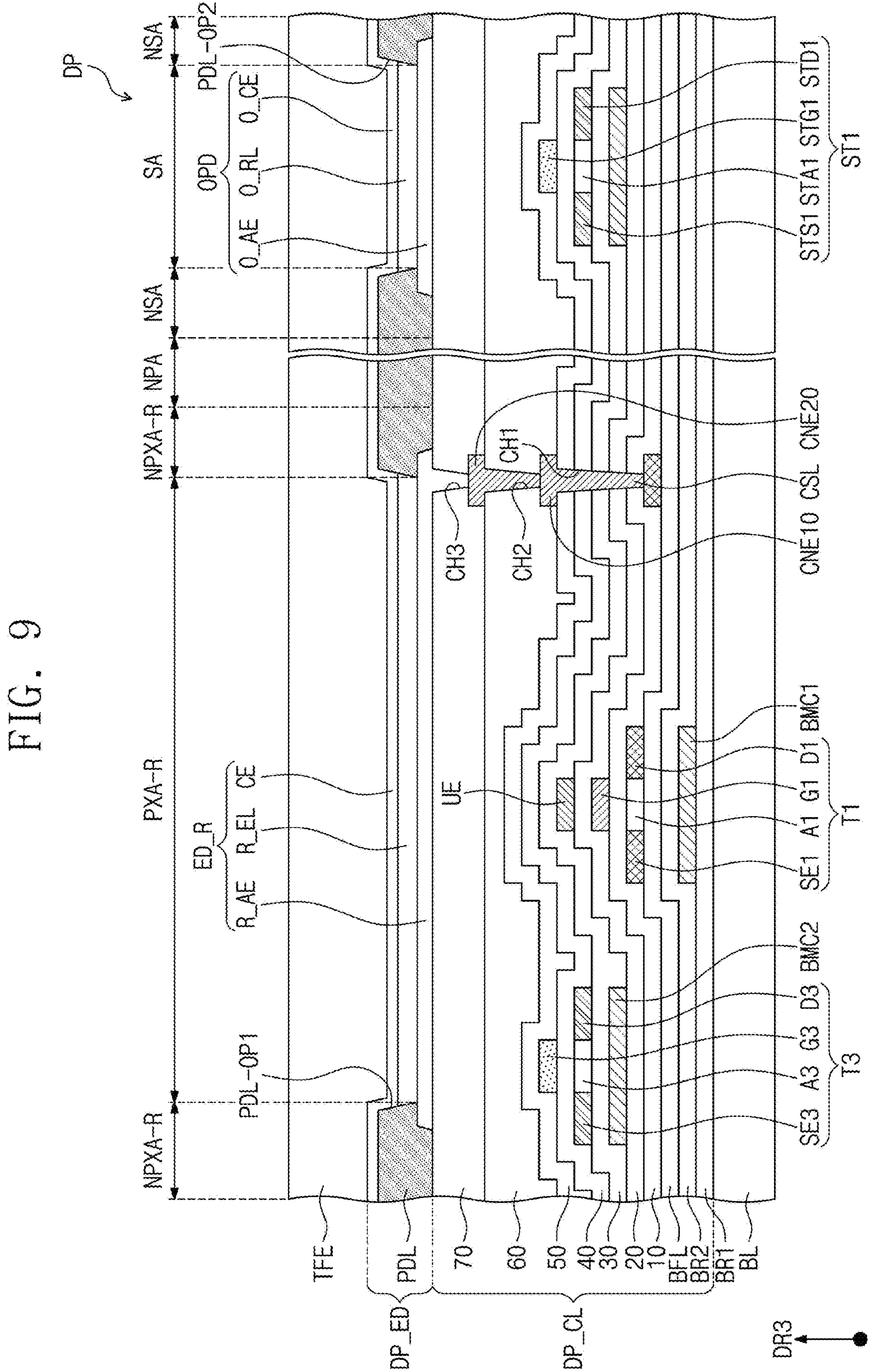
FIG. 9 is a cross-sectional view of a display panel, according to an embodiment of the present disclosure.

FIG. 9 is a cross-sectional view of the display panel DP, according to an embodiment of the present disclosure. FIG. 9 shows portions of the first and third transistors T1 and T3 shown in FIG. 5 and the reset transistor ST1 shown in FIG. 7A.

Referring to FIG. 9, the display panel DP may include the base layer BL, the circuit layer DP_CL disposed on the base layer BL, the element layer DP_ED, and the encapsulation layer TFE.

The base layer BL may include a synthetic resin layer. The synthetic resin layer may include a thermosetting resin. In an embodiment, the synthetic resin layer is a polyimide-based resin layer, but the material thereof is not limited thereto. The synthetic resin layer may include at least one of acrylate-based resin, methacrylate-based resin, polyisoprene, vinyl-based resin, epoxy-based resin, urethane-based resin, cellulose-based resin, siloxane-based resin, polyamide-based resin, and perylene-based resin. Besides, the base layer may include a glass substrate, a metal substrate, an organic/inorganic composite substrate, or the like.

At least one inorganic layer may be formed on an upper surface of the base layer BL. The inorganic layer may include at least one of aluminum oxide, titanium oxide, silicon oxide, silicon oxynitride, zirconium oxide, and hafnium oxide. The inorganic layer may be formed of multiple layers. The multi-layered inorganic layers may constitute barrier layers BR1 and BR2 and/or a buffer layer BFL, which will be described later. The barrier layers BR1 and BR2 and the buffer layer BFL may be disposed selectively.

The barrier layers BR1 and BR2 may prevent foreign objects from being introduced from the outside. The barrier layers BR1 and BR2 may include a silicon oxide layer and a silicon nitride layer. Each of the silicon oxide layer and the silicon nitride layer may include a plurality of layers, and the silicon oxide layers and the silicon nitride layers may be alternately stacked.

The barrier layers BR1 and BR2 may include the first barrier layer BR1 and the second barrier layer BR2. A first back metal layer BMC1 may be interposed between the first barrier layer BR1 and the second barrier layer BR2. In an embodiment of the present disclosure, the first back metal layer BMC1 is omitted.

The buffer layer BFL may be disposed on the barrier layers BR1 and BR2. The buffer layer BFL may increase a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

A first semiconductor pattern may be disposed on the buffer layer BFL. The first semiconductor pattern may include a silicon semiconductor. For example, the silicon semiconductor may include amorphous silicon or polycrystalline silicon. For example, the first semiconductor pattern may include low-temperature polysilicon.

FIG. 9 illustrates only a portion of the first semiconductor pattern disposed on the buffer layer BFL. Another portion of the first semiconductor pattern may be further disposed in another area. The first semiconductor pattern may be arranged across pixels according to a specific rule. The first semiconductor pattern may have electrical characteristics different depending on whether the first semiconductor pattern is doped. The first semiconductor pattern may include a first area having high conductivity and a second area having low conductivity. The first area may be doped with an N-type dopant or a P-type dopant. A P-type transistor may include an area doped with the P-type dopant, and an N-type transistor may include an area doped with the N-type dopant. The second area may be an undoped area or an area doped with a concentration lower than a concentration in the first area.

In an embodiment, the conductivity of the first area is greater than the conductivity of the second area. The first area may serve substantially as an electrode or a signal line. The second area may substantially correspond to an active area (or a channel) of a transistor. In other words, a part of the semiconductor pattern may be an active area of the transistor. Another part thereof may be a source or drain of the transistor. Another part thereof may be a connection electrode or a connection signal line.

A first electrode SE1, a channel part A1, and a second electrode D1 of the first transistor T1 are formed from the first semiconductor pattern. The first electrode SE1 and the second electrode D1 of the first transistor T1 extend in opposite directions from the channel part A1.

A portion of a connection signal line CSL formed from the first semiconductor pattern is illustrated in FIG. 9. The connection signal line CSL may be electrically connected to the second electrode of the sixth transistor T6 (refer to FIG. 5) on a plane.

A first insulating layer 10 may be disposed on the buffer layer BFL. The first insulating layer 10 may overlap a plurality of pixels in common and may cover the first semiconductor pattern. The first insulating layer 10 may be an inorganic layer and/or an organic layer, and may have a single layer or multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 is a single silicon oxide layer. An insulating layer of the circuit layer DP_CL and the first insulating layer 10 may be an inorganic layer and/or an organic layer, and may have a single layer structure or a multi-layer structure. The inorganic layer may include at least one of the above-described materials, but is not limited thereto.

A third electrode G1 of the first transistor T1 is disposed on the first insulating layer 10. The third electrode G1 may be a portion of a metal pattern. The third electrode G1 of the first transistor T1 overlaps the channel part A1 of the first transistor T1. In a process of doping the first semiconductor pattern, the third electrode G1 of the first transistor T1 may function as a mask. The third electrode G1 may include, but is not limited to, titanium (Ti), silver (Ag), an alloy containing silver (Ag), molybdenum (Mo), an alloy containing molybdenum (Mo), aluminum (Al), an alloy containing aluminum (Al), aluminum nitride (AlN), tungsten (W), tungsten nitride (WN), copper (Cu), indium tin oxide (ITO), indium zinc oxide (IZO), or the like.

A second insulating layer 20 may be disposed on the first insulating layer 10 and may cover the third electrode G1 of the first transistor T1. The second insulating layer 20 may be an inorganic layer and/or an organic layer, and may have a single layer structure or a multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

An upper electrode UE and a second back metal layer BMC2 may be disposed on the second insulating layer 20. The upper electrode UE may overlap the third electrode G1. The upper electrode UE may be a portion of a metal pattern. A portion of the third electrode G1 and the upper electrode UE overlapping the portion of the third electrode G1 may define the capacitor Cst (refer to FIG. 5). In an embodiment of the present disclosure, the second insulating layer 20 is replaced with an insulating pattern. In this case, the upper electrode UE may be disposed on an insulating pattern, and the upper electrode UE may serve as a mask for forming an insulating pattern from the second insulating layer 20.

The second back metal layer BMC2 may be disposed to correspond to a lower portion of an oxide thin film transistor (e.g., the third transistor T3). In an embodiment, the second back metal layer BMC2 receives a constant voltage or a signal. For example, the constant voltage may be a direct current (DC) voltage.

A third insulating layer 30 may be disposed on the second insulating layer 20 and may cover the upper electrode UE and the second back metal layer BMC2. The third insulating layer 30 may have a single layer or multi-layer structure. For example, the third insulating layer 30 may have a multi-layer structure including a silicon oxide layer and a silicon nitride layer.

A second semiconductor pattern may be disposed on the third insulating layer 30. The second semiconductor pattern may include an oxide semiconductor. The oxide semiconductor may include a plurality of areas that are distinguished from one another depending on whether metal oxide is reduced. An area (hereinafter referred to as a "reduction area") in which the metal oxide is reduced has higher conductivity than an area (hereinafter referred to as a "non-reduction area") in which the metal oxide is not reduced. The reduction area may serve substantially as a source/drain area of a transistor or a signal line. The non-reduction area substantially corresponds to an active area (alternatively, a semiconductor area or a channel) of the transistor. In other words, a part of the second semiconductor pattern may be the active area of the transistor; another part thereof may be the source/drain area of the transistor; and the other part thereof may be a signal transmission area.

A first electrode SE3, a channel part A3, and a second electrode D3 of the third transistor T3 are formed from the second semiconductor pattern. The first electrode SE3 and the second electrode D3 include a metal reduced from a metal oxide semiconductor. The first electrode SE3 and the second electrode D3 may extend in directions opposite to each other from the channel part A3 on a cross section.

A fourth insulating layer 40 may be disposed on the third insulating layer 30. The fourth insulating layer 40 may overlap a plurality of pixels in common and may cover the second semiconductor pattern. The fourth insulating layer 40 may include at least one of aluminum oxide, titanium oxide, silicon oxide, silicon nitride, silicon oxynitride, zirconium oxide, and hafnium oxide.

A third electrode G3 of the third transistor T3 is disposed on the fourth insulating layer 40. The third electrode G3 may be a portion of a metal pattern. The third electrode G3 of the third transistor T3 overlaps the channel part A3 of the third transistor T3. The third electrode G3 may function as a mask in a process of doping the second semiconductor pattern. In an embodiment of the present disclosure, the fourth insulating layer 40 may be replaced with an insulating pattern.

A fifth insulating layer 50 may be disposed on the fourth insulating layer 40 and may cover the third electrode G3. The fifth insulating layer 50 may be an inorganic layer.

A first connection electrode CNE10 may be disposed on the fifth insulating layer 50. The first connection electrode CNE10 may be connected to the connection signal line CSL through a first contact hole CH1 penetrating the first to fifth insulating layers 10, 20, 30, 40, and 50.

The sixth insulating layer 60 may be disposed on the fifth insulating layer 50. The sixth insulating layer 60 may be an organic layer. The organic layer may include polymers such as benzocyclobutene (BCB), polyimide, hexamethyldisiloxane (HMDSO), polymethylmethacrylate (PMMA) or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and the blend thereof, but is not particularly limited thereto.

A second connection electrode CNE20 may be disposed on the fifth insulating layer 60. The second connection electrode CNE20 may be connected to the first connection electrode CNE10 through a second contact hole CH2 penetrating the sixth insulating layer 60. The seventh insulating layer 70 may be disposed on the sixth insulating layer 60 and may cover the second connection electrode CNE20. The seventh insulating layer 70 may be an organic layer.

A first electrode layer may be disposed on the circuit layer DP_CL. A pixel defining layer PDL is formed on the first electrode layer. The first electrode layer may include a first anode R_AE and the light sensing anode O_AE. In an embodiment, the first anode R_AE and the light sensing anode O_AE are disposed on the seventh insulating layer 70. The first anode R_AE may be connected to the second connection electrode CNE20 through a third contact hole CH3 penetrating the seventh insulating layer 70. FIG. 9 shows only the first anode R_AE corresponding to the light emitting element ED_R (refer to FIG. 4). However, the first electrode layer may further include a second anode G_AE (refer to FIG. 10) corresponding to the light emitting element ED_G (refer to FIG. 4) and a third anode corresponding to the light emitting element ED_B (refer to FIG. 4).

First and second film openings PDL-OP1 and PDL-OP2 are provided on the pixel defining layer PDL. The first film opening PDL-OP1 exposes at least part of the first anode R_AE. The second film opening PDL-OP2 exposes at least part of the light sensing anode O_AE.

In an embodiment of the present disclosure, the pixel defining layer PDL further includes a black material. The pixel defining layer PDL may further include a black organic dye/pigment such as carbon black, aniline black, or the like. The pixel defining layer PDL may be formed by mixing a blue organic material and a black organic material. The pixel defining layer PDL may further include a liquid-repellent organic material.

As shown in FIG. 9, the display panel DP may include an emission area 7-R and a non-emission area NPXA-R adjacent to the emission area PXA-R. The non-emission area NPXA-R may surround the emission area PXA-R. In an embodiment, the emission area PXA-R is defined to correspond to a partial area of the first anode R_AE exposed by the first film opening PDL-OP1.

A light emitting layer may be disposed on the first electrode layer. The light emitting layer may include red, green and blue light emitting layers. The red, green, and blue light emitting layers may be disposed in areas corresponding to the first film openings PDL-OP1. The red, green, and blue light emitting layers may be separately formed in red, green, and blue pixels PXR, PXG, and PXB illustrated in FIG. 4, respectively. Each of the red, green, and blue light emitting layers may include an organic material and/or an inorganic material. The red, green and blue light emitting layers may generate a predetermined colored light. For example, the light emitting layer R_EL may generate red light. FIG. 9 shows that the light emitting layer R_EL is disposed in an area corresponding to the first film opening PDL-OP1.

In an embodiment, patterned red, green, and blue light emitting layers are described. However, a single light emitting layer may be commonly disposed in a plurality of emission areas. At this time, the light emitting layer may generate white light or blue light. Also, the light emitting layer may have a multi-layer structure referred to as "tandem".

The light emitting layer R_EL may include a low-molecular organic material or a high-molecular organic material as a light emitting material. A cathode CE is disposed on the light emitting layer R_EL. As an example of the present disclosure, the cathode CE may be commonly disposed in the emission area PXA-R, the non-emission area NPXA-R, and a non-pixel area NPA. For example, a single layer may be used to implement the cathode CE to overlap the emission area PXA-R, the non-emission area NPXA-R, and the non-pixel area NPA.

The circuit layer DP_CL may further include the sensor driving circuit SDC (refer to FIG. 7A). For convenience of description, the reset transistor ST1 of the sensor driving circuit SDC is shown. A first electrode STS1, a channel part STA1, and a second electrode STD1 of the reset transistor ST1 are formed from the second semiconductor pattern. The first electrode STS1 and the second electrode STD1 may include a metal reduced from a metal oxide semiconductor. The fourth insulating layer 40 is disposed to cover the first electrode STS1, the channel part STA1, and the second electrode STD1 of the reset transistor ST1. A third electrode STG1 of the reset transistor ST1 is disposed on the fourth insulating layer 40. In an embodiment, the third electrode STG1 is a part of the metal pattern. The third electrode STG1 of the reset transistor ST1 overlaps the channel part STA1 of the reset transistor ST1.

In an embodiment of the present disclosure, the reset transistor ST1 is disposed on the same layer as the third transistor T3. That is, the first electrode STS1, the channel part STA1, and the second electrode STD1 of the reset transistor ST1 may be formed through a same process as the first electrode SE3, the channel part A3, and the second electrode D3 of the third transistor T3. The third electrode STG1 of the reset transistor ST1 may be simultaneously formed through the same process as the third electrode G3 of the third transistor T3. The first electrode and the second electrode of each of the amplification transistor ST2 and the output transistor ST3 of the sensor driving circuit SDC may be formed through the same process as the first electrode SE1 and the second electrode D1 of the first transistor T1. The reset transistor ST1 and the third transistor T3 may be formed on the same layer through the same process. Accordingly, because an additional process of forming the reset transistor ST1 is not required, process efficiency and manufacturing costs may be reduced.

The element layer DP_ED may further include the light sensing element OPD (refer to FIG. 7A). FIG. 9 shows only the light sensing element OPD.

The light sensing element OPD may include the light sensing anode O_AE, a photoelectric conversion layer O_RL, and a cathode O_CE. The light sensing anode O_AE may be disposed on the same layer as the first electrode layer. That is, the light sensing anode O_AE may be disposed on the circuit layer DP_CL, and may be simultaneously formed through the same process as the first anode R_AE.

The second film opening PDL-OP2 of the pixel defining layer PDL exposes at least part of the light sensing anode O_AE. The photoelectric conversion layer O_RL is disposed on the light sensing anode O_AE exposed by the second film opening PDL-OP2. The photoelectric conversion layer O_RL may include an organic photo-sensing material. The photoelectric cathode O_CE may be disposed on the photoelectric conversion layer O_RL. The photoelectric cathode O_CE may be simultaneously formed through the same process as the cathode CE. As an example of the present disclosure, the photoelectric cathode O_CE may be integrated with the cathode CE.

Each of the light sensing anode O_AE and the photoelectric cathode O_CE may receive an electrical signal. The photoelectric cathode O_CE may receive a signal different from that of the light sensing anode O_AE. Accordingly, a predetermined electric field may be formed between the light sensing anode O_AE and the photoelectric cathode O_CE. The photoelectric conversion layer O_RL generates an electrical signal corresponding to the light incident on a sensor. The photoelectric conversion layer O_RL may generate charges by absorbing the energy of the incident light. For example, the photoelectric conversion layer O_RL may include a light-sensitive semiconductor material.

The charges generated by the photoelectric conversion layer O_RL change an electric field between the light sensing anode O_AE and the photoelectric cathode O_CE. The amount of charge generated by the photoelectric conversion layer O_RL may vary depending on whether light is incident onto the light sensing element OPD, the amount of light incident onto the light sensing element OPD, and the intensity of light incident onto the light sensing element OPD. Accordingly, the electric field formed between the light sensing anode O_AE and the photoelectric cathode O_CE may be changed. The light sensing element OPD according to an embodiment of the present disclosure may obtain one of the fingerprint, blood pressure, and touch information of a user through a change in the electric field between the light sensing anode O_AE and the photoelectric cathode O_CE. For example, one of the fingerprint, blood pressure, and touch information of a user may be determined from the change in the electric field between the light sensing anode O_AE and the photoelectric cathode O_CE.

However, this is illustrated by way of example. The light sensing element OPD may include a phototransistor that uses the photoelectric conversion layer O_RL as an active layer. In this case, the light sensing element OPD may obtain fingerprint information by sensing the amount of current flowing through the phototransistor. The light sensing element OPD according to an embodiment of the present disclosure may include various photoelectric conversion elements capable of generating electrical signals in response to a change in the amount of light, but the present disclosure is not limited to an embodiment.

The encapsulation layer TFE is disposed on the element layer DP_ED. The encapsulation layer TFE includes at least one inorganic layer or at least one organic layer. In an embodiment of the present disclosure, the encapsulation layer TFE includes two inorganic layers and an organic layer disposed therebetween. In an embodiment of the present disclosure, the encapsulation layer TFE is a thin film encapsulation layer including a plurality of inorganic layers and a plurality of organic layers, which are alternately stacked.

The inorganic layer of the encapsulation layer TFE may protect the light emitting element ED_R and the light sensing element OPD from moisture/oxygen, and the organic layer of the encapsulation layer TFE may protect the light emitting element ED_R and the light sensing element OPD from foreign substances. The inorganic layer of the encapsulation layer TFE may include a silicon nitride layer, a silicon oxynitride layer, a silicon oxide layer, a titanium oxide layer, an aluminum oxide layer, or the like, but is not limited thereto. The organic layer of the encapsulation layer TFE may include an acryl-based organic layer, but is not limited thereto.

Figure 10:
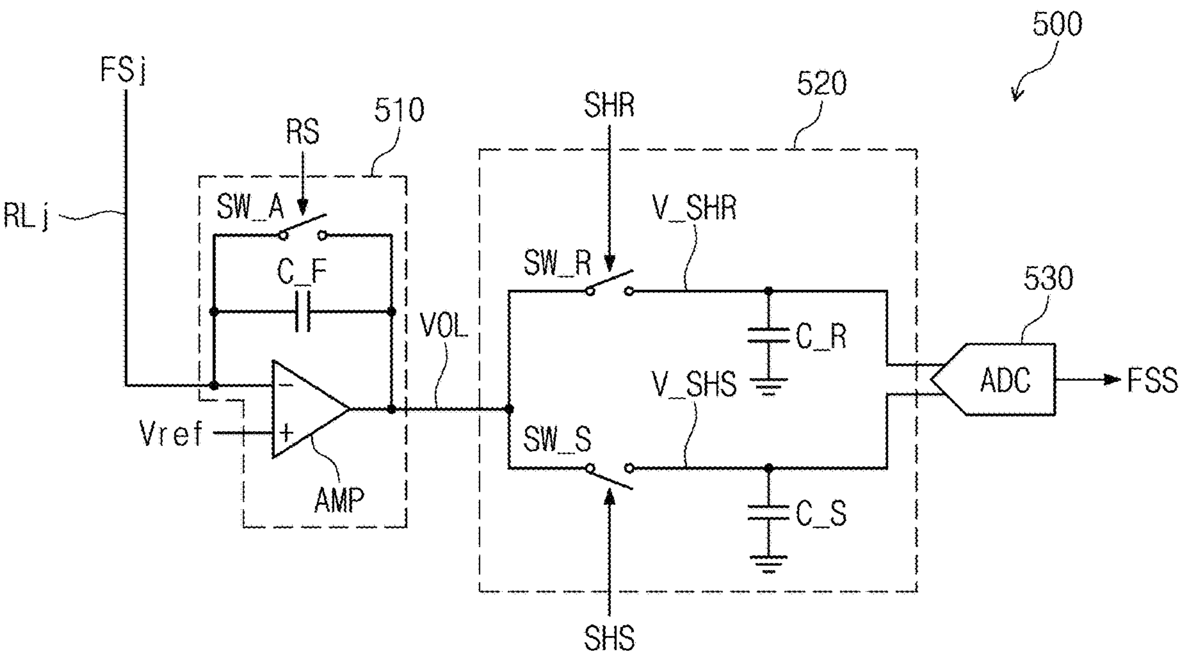
FIG. 10 is a diagram showing a circuit configuration of a readout circuit, according to an embodiment of the present disclosure.

FIG. 10 is a diagram showing a circuit configuration of the readout circuit 500, according to an embodiment of the present disclosure.

FIG. 10 illustrates circuits related to receiving the sensing signal FSj from the j-th readout line RLj among the readout lines RL1 to RLk (refer to FIG. 3) in the overall circuit configuration of the readout circuit 500.

Referring to FIG. 10, the readout circuit 500 may include a sensing circuit 510, a sample and hold circuit 520, and an analog-to-digital converter 530.

The sensing circuit 510 includes an operational amplifier AMP, a capacitor C_F, and a switch SW_A. A reference voltage Vref may be input to a non-inverting input terminal (+) of the operational amplifier AMP, and the readout line RLj (e.g., RL1) may be connected to an inverting input terminal (−) of the operational amplifier AMP. That is, the sensing signal FS1 may be provided to the inverting input terminal (−) of the operational amplifier AMP. The capacitor C_F may be connected between the inverting input terminal (−) of the operational amplifier AMP and an output terminal VOL of the operational amplifier AMP, and the switch SW_A may be connected in parallel across the capacitor C_F.

The sample and hold circuit 520 may include a first switch SW_R, a first capacitor C_R, a second switch SW_S, and a second capacitor C_S. The first switch SW_R and the first capacitor C_R may be referred to as a "first sampling circuit". The second switch SW_S and the second capacitor C_S may be referred to as a "second sampling circuit".

Figure 11:
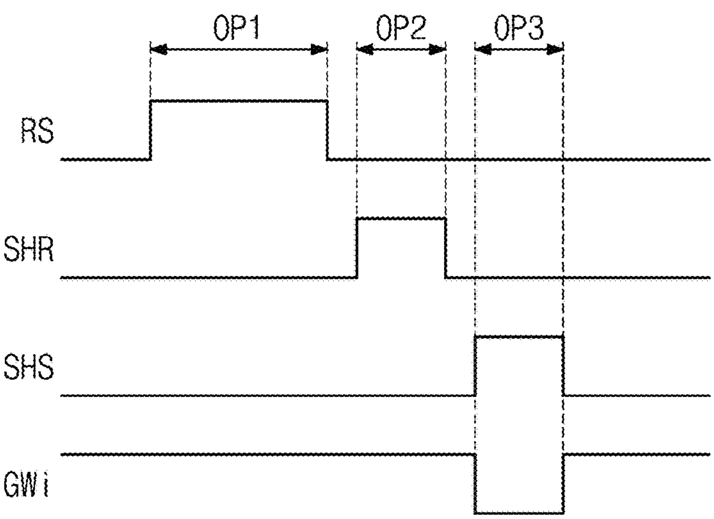
FIG. 11 is a timing diagram for an operation of a readout circuit shown in FIG. 10.

FIG. 11 is a timing diagram for an operation of the readout circuit 500 shown in FIG. 10.

Referring to FIGS. 10 and 11, when the first switching signal RS is at a high level during a first period OP1, the switch SW_A is turned on. When the switch SW_A is turned on, the readout line RLj (e.g., RL1) is electrically connected to the output terminal VOL of the operational amplifier AMP. Accordingly, the capacitor C_F may be initialized. When the first switching signal RS transitions to a low level, the sensing circuit 510 may operate as an integrator.

When the second switching signal SHR is at a high level during a second period OP2, the first switch SW_R is turned on. When the first switch SW_R is turned on, the first capacitor C_R is charged with the voltage of the output terminal VOL of the sensing circuit 510. For example, the first switch SW_R may be turned on at a point in time when photocharges of the light sensing element OPD are not delivered to the j-th the readout line RLj as the sensing signal FSj. Accordingly, the first capacitor C_R may be charged with a first sampling signal V_SHR corresponding to noise.

When the scan signal GW1 transitions to a low level during a third period OP3, the output transistor ST3 shown in FIG. 7A is turned on. Accordingly, a current of the second sensing node SN2 may be delivered to the readout line RLj as the sensing signal FSj through the output transistor ST3. In the case, when the second switch SW_S is turned on, the second capacitor C_S is charged with the voltage of the output terminal VOL of the sensing circuit 510. Accordingly, the second sampling signal V_SHS corresponding to the sensing signal FSj may be charged in the second capacitor C_S.

The analog-to-digital converter 530 converts a difference (or a difference value) between the first sampling signal V_SHR of the first capacitor C_R and the second sampling signal V_SHS of the second capacitor C_S into a digital signal (or a digital code) to output the readout signal FSS.

The first switching signal RS for periodically turning on the switch SW_A may be output during a reset time to reset the voltage of the output terminal VOL of the operational amplifier AMP.

The sensing signal FSj is proportional to the amount of photocharges generated by the light sensing element OPD. Because the amount of current change between a point in time when light is not detected and at a point in time when light is detected is small, a voltage difference between the first sampling signal V_SHR and the second sampling signal V_SHS is also very small. The capacitance of the capacitor C_F may need to be increased to secure a sufficient voltage difference between the first sampling signal V_SHR and the second sampling signal V_SHS. However, increasing the capacitance may increase the circuit area of the readout circuit 500.

Figure 12:
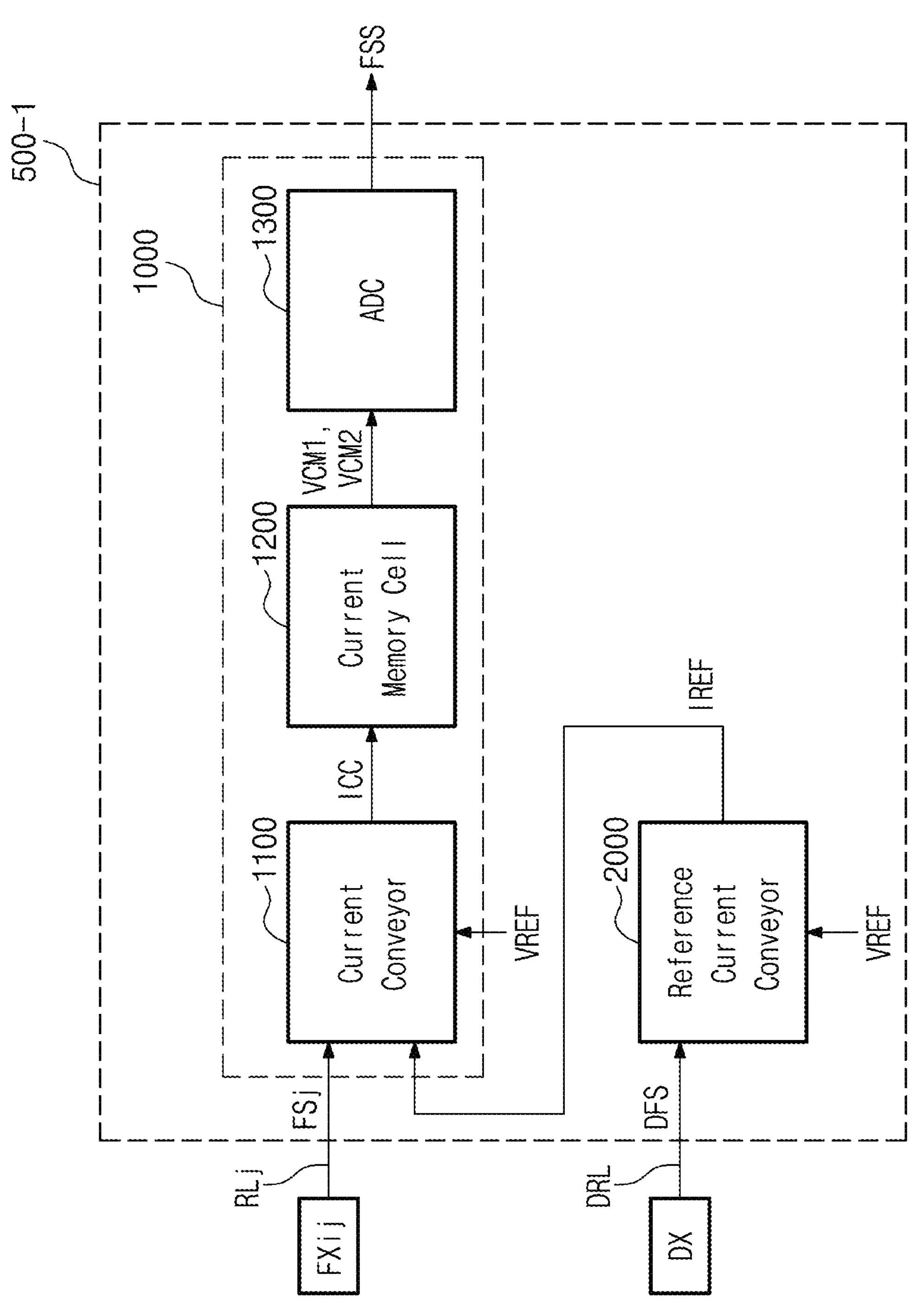
FIG. 12 is a block diagram of a readout circuit, according to an embodiment of the present disclosure.

FIG. 12 is a block diagram of a readout circuit 500-1, according to an embodiment of the present disclosure. In an embodiment, the readout circuit 500 is replaced with the readout circuit 500-1.

Referring to FIG. 12, the readout circuit 500-1 includes a sensing circuit 1000 and a reference current conveyor 2000 (e.g., a circuit).

The sensing circuit 1000 may include a current conveyor 1100 (e.g., a circuit), a current memory cell 1200, and an analog-to-digital converter 1300.

The current conveyor 1100 receives the sensing signal FSj from the sensor FXij through the readout line RLj. Moreover, the current conveyor 1100 receives a reference signal IREF from the reference current conveyor 2000. The current conveyor 1100 outputs a conveyor signal ICC based on the sensing signal FSj and the reference signal IREF. In an embodiment, the current conveyor 1100 does not include any capacitors.

In an embodiment, the conveyor signal ICC is a difference between the sensing signal FSj and the reference signal IREF.

The current memory cell 1200 stores the conveyor signal ICC, and outputs a first voltage signal VCM1 and a second voltage signal VCM2. The current memory cell 1200 may store many values of the conveyor signal ICC over time to represent an analog signal. In an embodiment, the first voltage signal VCM1 corresponds to the conveyor signal ICC during a first period and the second voltage signal VCM2 corresponds to the conveyor signal ICC during a second period different from the first period. For example, the first voltage signal VCM1 may be a first analog signal determined from first values of the conveyor signal ICC during the first period and the second voltage signal VCM2 may be a second analog signal determined from second values of the conveyor signal ICC during the second period.

The analog-to-digital converter 1300 outputs the readout signal FSS based on the first voltage signal VCM1 and the second voltage signal VCM2. In an embodiment, the analog-to-digital converter 1300 outputs the readout signal FSS based on a difference between the first voltage signal VCM1 and the second voltage signal VCM2. For example, a difference signal may be calculated by subtracting one voltage signal (e.g., VCM2) among the voltage signals (e.g., VCM1 and VCM2) from the other voltage signal (e.g., VCM1), and the analog-to-digital converter 1300 may convert the difference signal to the readout signal FSS.

The reference current conveyor 2000 outputs the reference signal IREF based on the dummy sensing signal DFS received from the dummy sensor DX through the dummy readout line DRL.

Figure 13:
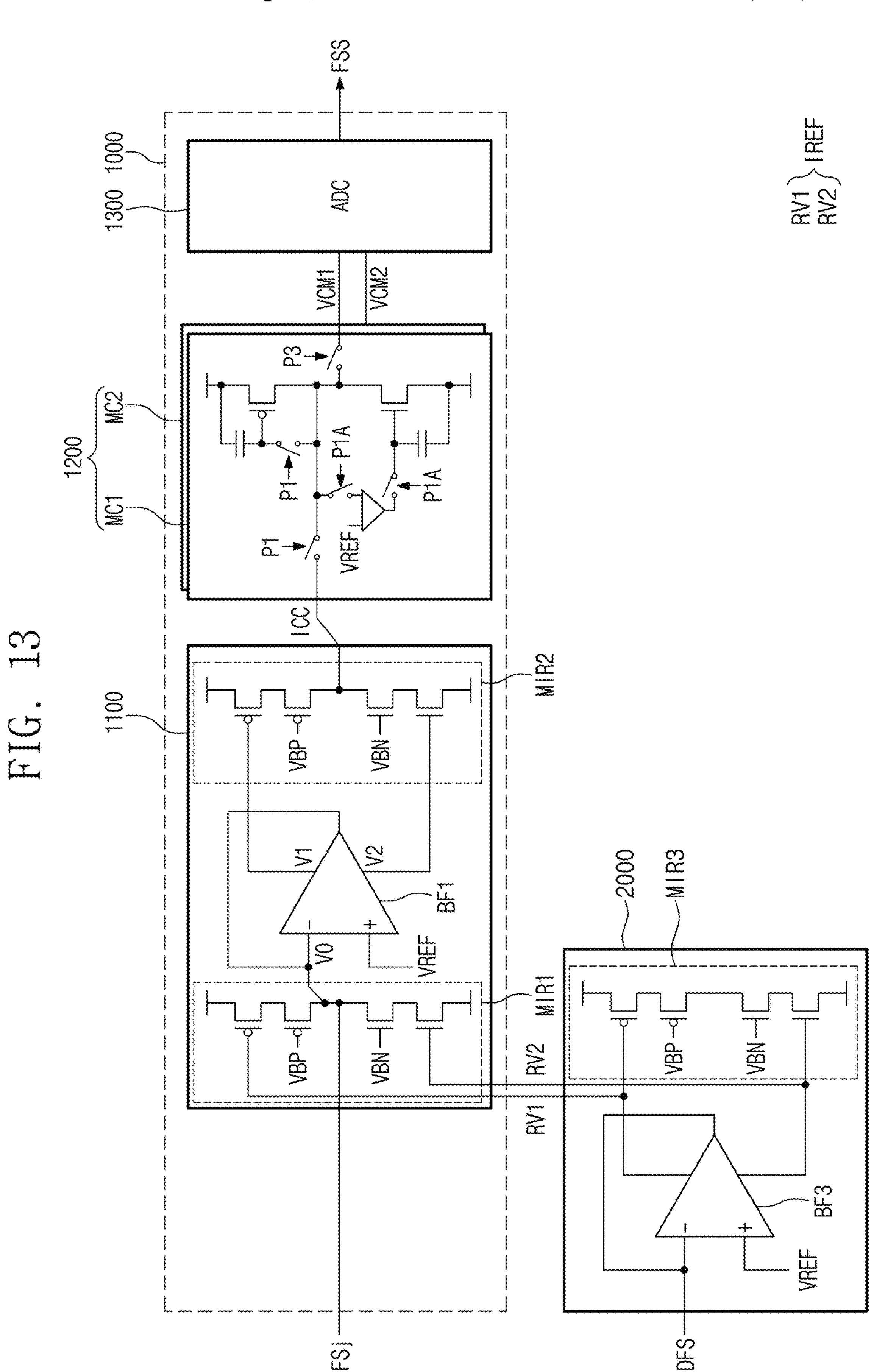
FIG. 13 is a block diagram of a sensing circuit and a reference current conveyor.

FIG. 13 is a block diagram illustrating a circuit configuration of the sensing circuit 1000 and the reference current conveyor 2000 according to an embodiment.

Referring to FIG. 13, the sensing circuit 1000 includes the current conveyor 1100, the current memory cell 1200, and the analog-to-digital converter 1300.

The current conveyor 1100 includes a first current mirror circuit MIR1, a buffer circuit BF1, and a second current mirror circuit MIR2.

The first current mirror circuit MIR1 receives the sensing signal FSj, reference voltage signals RV1 and RV2, and bias voltages VBP and VBN to output a voltage signal V0.

The buffer circuit BF1 receives the voltage signal V0 and a reference voltage VREF to output a first voltage V1 and a second voltage V2.

The second current mirror circuit MIR2 receives the first voltage V1, the second voltage V2, and the bias voltages VBP and VBN to output the conveyor signal ICC.

The current memory cell 1200 includes a first memory cell MC1 and a second memory cell MC2.

Each of the first memory cell MC1 and the second memory cell MC2 store the conveyor signal ICC. The first memory cell MC1 and the second memory cell MC2 may selectively store the conveyor signal ICC in response to switching signals. For example, the first memory cell MC1 may store the conveyor signal ICC during a first period and the second memory cell MC2 may store the conveyor signal ICC during a second period.

The first memory cell MC1 outputs the first voltage signal VCM1 corresponding to the conveyor signal ICC in response to the switching signal. For example, the first memory cell MC1 may output the first voltage signal VCM1 corresponding to the conveyor signal ICC during a first period.

The second memory cell MC2 outputs the second voltage signal VCM2 corresponding to the conveyor signal ICC in response to the switching signal. For example, the second memory cell MC2 may output the second voltage signal VCM2 corresponding to the conveyor signal ICC during a second period.

The analog-to-digital converter 1300 outputs the readout signal FSS based on the first voltage signal VCM1 and the second voltage signal VCM2.

The reference current conveyor 2000 includes a buffer circuit BF3 and a third current mirror circuit MIR3. In an embodiment, the reference current conveyor 2000 does not include any capacitor.

The buffer circuit BF3 receives the dummy sensing signal DFS and the reference voltage VREF to output the reference voltage signals RV1 and RV2. The buffer circuit BF3 may be an operational amplifier having an inverting input terminal receiving the dummy sensing signal DFS and a non-inverting input terminal receiving the reference voltage VREF.

The third current mirror circuit MIR3 receives the reference voltage signals RV1 and RV2 and the bias voltages VBP and VBN.

FIG. 14 is a circuit diagram of the buffer circuit BF1 and the second current mirror circuit MIR2 in the current conveyor 1100, according to an embodiment of the present disclosure.

Referring to FIG. 14, the buffer circuit BF1 includes transistors TR1 to TR21.

The transistor TR1 is connected between a first node N1 and a third node N3 and includes a gate electrode connected to a first input node IN1. The transistor TR2 is connected between a second node N2 and the third node N3 and includes a gate electrode connected to a second input node IN2.

The transistor TR3 is connected between a fourth node N4 and a fifth node N5 and includes a gate electrode connected to the first input node IN1. The transistor TR4 is connected between the fourth node N4 and a sixth node N6 and includes a gate electrode connected to the second input node IN2.

The transistor TR5 is connected between a first voltage terminal VIN1 and the fourth node N4 and includes a gate electrode that receives a bias voltage VBP<2>. The transistor TR6 is connected between the first voltage terminal VIN1 and the first node N1 and includes a gate electrode connected to a seventh node N7. The transistor TR7 is connected between the first node N1 and the seventh node N7 and includes a gate electrode that receives a bias voltage VBP<0>. The transistor TR8 is connected between the seventh node N7 and an eighth node N8 and includes a gate electrode that receives a bias voltage VBP<1>. The transistor TR9 is connected between the seventh node N7 and the eighth node N8 and includes a gate electrode that receives a bias voltage VBN<1>.

The transistor TR10 is connected between the eighth node N8 and the fifth node N5 and includes a gate electrode that receives a bias voltage VBN<0>. The transistor TR11 is connected between the fifth node N5 and a second voltage terminal VIN2 and includes a gate electrode connected to the eighth node N8.

The transistor TR12 is connected between the first voltage terminal VIN1 and the second node N2 and includes a gate electrode connected to the seventh node N7. The transistor TR13 is connected between the second node N2 and a ninth node N9 and includes a gate electrode that receives the bias voltage VBP<0>. The transistor TR14 is connected between the ninth node N9 and a tenth node N10 and includes a gate electrode that receives the bias voltage VBP<1>. The transistor TR15 is connected between the ninth node N9 and the tenth node N10 and includes a gate electrode that receives the bias voltage VBN<1>.

The transistor TR16 is connected between the tenth node N10 and the sixth node N6 and includes a gate electrode that receives the bias voltage VBN<0>. The transistor TR17 is connected between the sixth node N6 and the second voltage terminal VIN2 and includes a gate electrode connected to the eighth node N8.

The transistors TR18, TR19, TR20, and TR21 are sequentially connected in series between the first voltage terminal VIN1 and the second voltage terminal VIN2. The transistor TR18 includes a gate electrode connected to the ninth node N9. The transistor TR19 includes a gate electrode that receives the bias voltage VBP<0>. The transistor TR20 includes a gate electrode that receives the bias voltage VBN<0>. The transistor TR21 includes a gate electrode connected to the tenth node N10.

The first input node IN1 receives a first signal X, and the second input node IN2 receives a second signal Y. In an embodiment, the first signal X is the voltage signal V0 output from the first current mirror circuit MIR1 shown in FIG. 13, and a second signal Y is the reference voltage VREF.

In an embodiment, the first voltage terminal VIN1 receives a power supply voltage VDD, and the second voltage terminal VIN2 receives a second power supply voltage VSS. In an embodiment, the power supply voltage VDD is higher than the second power supply voltage VSS. In an embodiment, the second power supply voltage VSS is a ground voltage.

In an embodiment, the buffer circuit BF1 outputs the first voltage V1 and the second voltage V2 corresponding to a difference (i.e., a difference between the voltage signal V0 (refer to FIG. 13) and the reference voltage VREF) between the first signal X provided to the first input node IN1 and the second signal Y provided to the second input node IN2. In an embodiment, the voltage of the ninth node N9 is the first voltage V1 and the voltage of the tenth node N10 is the second voltage V2. The first voltage V1 and the second voltage V2 are provided as inputs to the second current mirror circuit MIR2.

The second current mirror circuit MIR2 includes transistors TR31, TR32, TR33, and TR34.

The transistors TR31, TR32, TR33, and TR34 are sequentially connected in series between the first voltage terminal VIN1 and the second voltage terminal VIN2. The transistor TR31 includes a gate electrode connected to the ninth node N9. The transistor TR32 includes a gate electrode that receives the bias voltage VBP<0>. The transistor TR33 includes a gate electrode that receives the bias voltage VBN<0>. The transistor TR34 includes a gate electrode connected to the tenth node N10.

The second current mirror circuit MIR2 receives the first voltage V1, the second voltage V2, and bias voltages VBP<0> and VBN<0> to output the conveyor signal ICC.

In an embodiment, the buffer circuit BF3 of the reference current conveyor 2000 shown in FIG. 13 has a circuit configuration similar to the buffer circuit BF1 in the current conveyor 1100 shown in FIG. 14.

Figure 15:
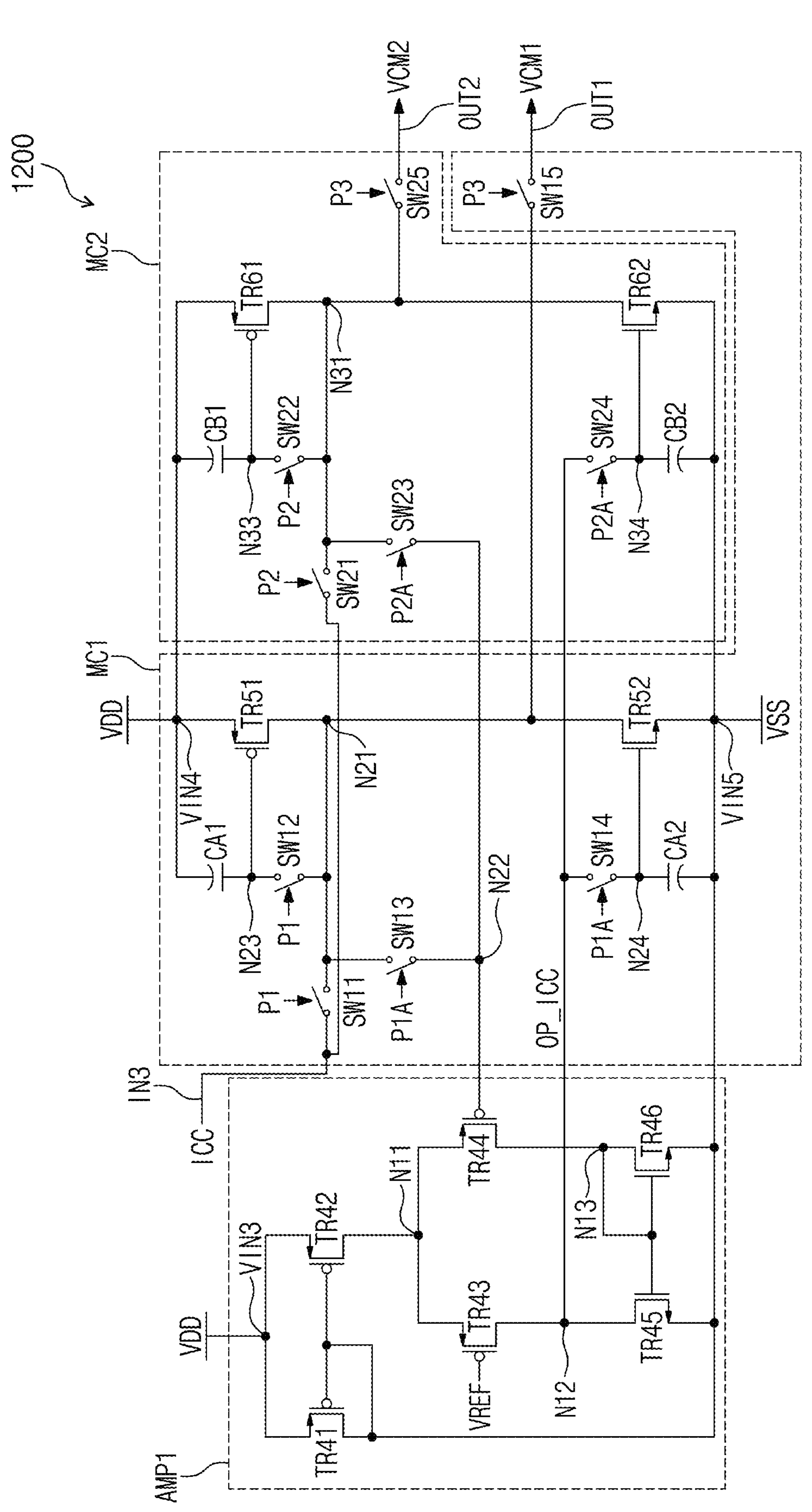
FIG. 15 is a circuit diagram of a current memory cell, according to an embodiment of the present disclosure.

FIG. 15 is a circuit diagram of the current memory cell 1200, according to an embodiment of the present disclosure.

Referring to FIG. 15, the current memory cell 1200 includes an operational amplifier AMP1, the first memory cell MC1, and the second memory cell MC2.

The operational amplifier AMP1 includes a first input terminal, a second input terminal, an output node N12, and transistors TR41 to TR46.

The transistor TR41 is connected between a third voltage terminal VIN3 and a fifth voltage terminal VIN5, and includes a gate electrode connected to the fifth voltage terminal VIN5. The transistor TR42 is connected between the third voltage terminal VIN3 and an eleventh node N11, and includes a gate electrode connected to the fifth voltage terminal VIN5.

The transistor TR43 is connected between the eleventh node N11 and the twelfth node N12 and includes a gate electrode connected to the first input terminal. The first input terminal receives the reference voltage VREF.

The transistor TR44 is connected between the eleventh node N11 and a thirteenth node N13 and includes a gate electrode connected to the second input terminal. The second input terminal is commonly connected to a 22nd node N22 of the first memory cell MC1 and the second memory cell MC2.

The transistor TR45 is connected between the twelfth node N12 and the fifth voltage terminal VIN5, and includes a gate electrode connected to the thirteenth node N13. The transistor TR46 is connected between the thirteenth node N13 and the fifth voltage terminal VIN5, and includes a gate electrode connected to the thirteenth node N13.

The first memory cell MC1 includes transistors TR51 and TR52, switches SW11 to SW15 and capacitors CA1 and CA2.

The transistor TR51 is connected between a fourth voltage terminal VIN4 and a 21st node N21, and includes a gate electrode connected to a 23rd node N23. The transistor TR52 is connected between the 21st node N21 and the fifth voltage terminal VIN5, and includes a gate electrode connected to a 24th node N24.

The capacitor CA1 is connected between the fourth voltage terminal VIN4 and the 23rd node N23. The capacitor CA2 is connected between the 24th node N24 and the fifth voltage terminal VIN5.

The switch SW11 is connected between a third input node IN3 and the 21st node N21 and is controlled in response to a switching signal P1. The switch SW12 is connected between the 23rd node N23 and the 21st node N21 and is controlled in response to the switching signal P1. The switch SW13 is connected between the 21st node N21 and the 22nd node N22 and is controlled in response to a switching signal P1A. The switch SW14 is connected between the twelfth node N12 of the operational amplifier AMP1 and the 24th node N24 and is controlled in response to the switching signal P1A. The switch SW15 is connected between the 21st node N21 and an output node OUT1 and is controlled in response to a switching signal P3.

The second memory cell MC2 includes transistors TR61 and TR62, switches SW21 to SW25, and capacitors CB1 and CB2.

The transistor TR61 is connected between the fourth voltage terminal VIN4 and a 31st node N31, and includes a gate electrode connected to a 33rd node N33. The transistor TR62 is connected between the 31st node N31 and the fifth voltage terminal VIN5, and includes a gate electrode connected to a 34th node N34.

The capacitor CB1 is connected between the fourth voltage terminal VIN4 and the 33rd node N33. The capacitor CB2 is connected between the 34th node N34 and the fifth voltage terminal VIN5.

The switch SW21 is connected between the third input node IN3 and the 31st node N31 and is controlled in response to a switching signal P2. The switch SW22 is connected between the 33rd node N33 and the 31st node N31 and is controlled in response to the switching signal P2. The switch SW23 is connected between the 31st node N31 and the 22nd node N22 and is controlled in response to a switching signal P2A. The switch SW24 is connected between the twelfth node N12 of the operational amplifier AMP1 and the 34th node N34 and is controlled in response to the switching signal P2A. The switch SW25 is connected between the 31st node N31 and the output node OUT2 and is controlled in response to a switching signal P3.

Figure 16:
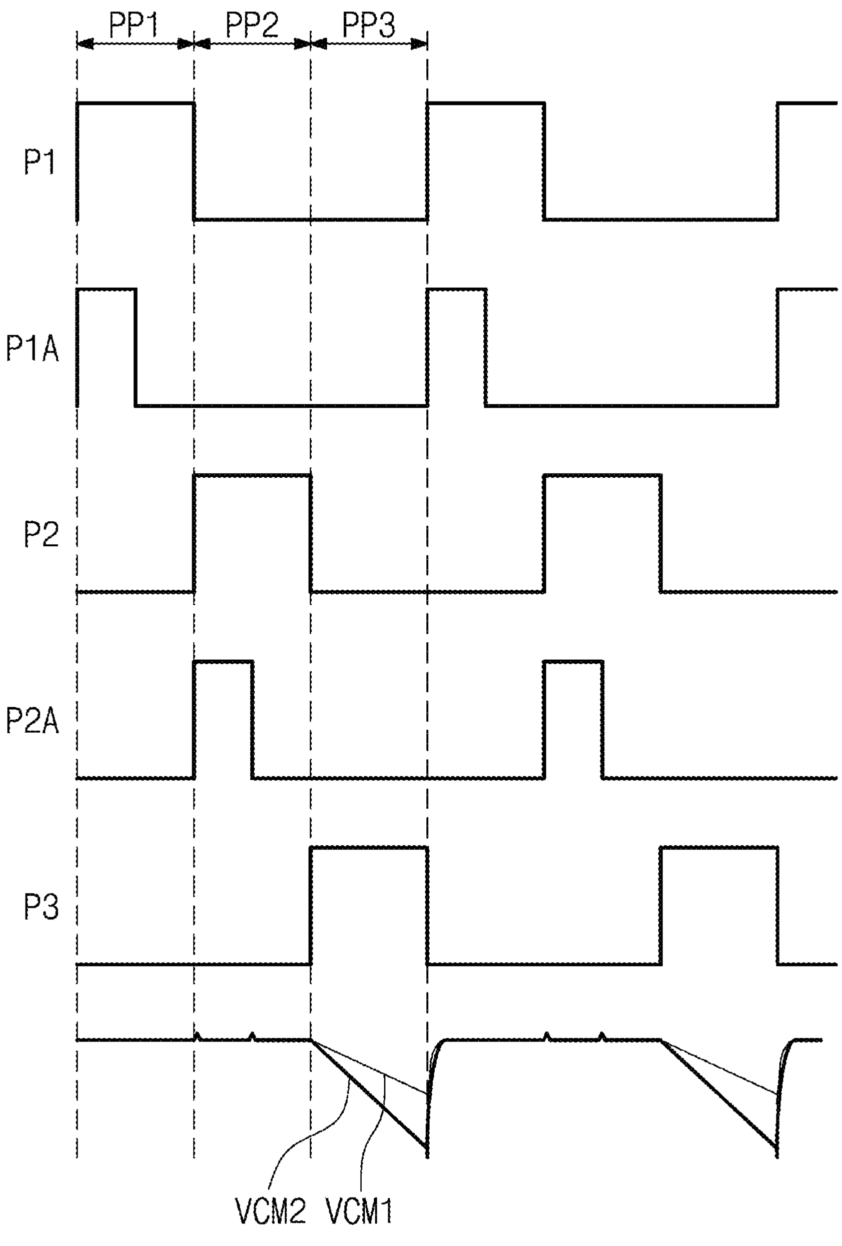
FIG. 16 is a timing diagram for an operation of a first memory cell and a second memory cell shown in FIG. 15.

FIG. 16 is a timing diagram for an operation of the first memory cell MC1 and the second memory cell MC2 shown in FIG. 15.

Referring to FIGS. 15 and 16, when the switching signal P1 is at a high level during a first period PP1, the switches SW11 and SW12 are turned on. As a result, a voltage corresponding to the conveyor signal ICC may be stored in the capacitor CA1 through switches SW11 and SW12.

Meanwhile, when the switching signal P1A is at a high level during a part of the first period PP1, the switches SW13 and SW14 are turned on. When the switch SW13 is turned on, a current signal OP_ICC corresponding to a voltage level of the 22nd node N22 flows to the twelfth node N12. Accordingly, the voltage corresponding to the conveyor signal ICC may be stored in the capacitor CA2.

When the switching signal P2 is at a high level during a second period PP2, the switches SW21 and SW22 are turned on. As a result, a voltage corresponding to the conveyor signal ICC may be stored in the capacitor CB1 through switches SW21 and SW22.

In the meantime, when the switching signal P2A is at a high level during a part of the second period PP2, the switches SW23 and SW24 are turned on. When the switch SW23 is turned on, a current corresponding to a voltage level of the 22nd node N22 flows to the twelfth node N12. Accordingly, the voltage corresponding to the conveyor signal ICC may be stored in the capacitor CB2.

When the switching signals P1 and P1A are at low levels during second and third periods PP2 and PP3, all switches SW11 to SW14 are turned off. Accordingly, a current flows through the transistors TR51 and TR52 depending on the voltage stored in the capacitors CA1 and CA2.

When the switching signal P3 is at a high level during the third period PP3, the switch SW15 may be turned on, and the voltage of the 21st node N21 may be output as the first voltage signal VCM1.

When the switching signals P2 and P2A are at low levels during the third period PP3, all the switches SW21 to SW24 are turned off. Accordingly, a current flows through the transistors TR61 and TR62 depending on the voltage stored in the capacitors CB1 and CB2.

When the switching signal P3 is at a high level during the third period PP3, the switch SW25 may be turned on, and the voltage of the 31st node N31 may be output as the second voltage signal VCM2.

The conveyor signal ICC corresponding to the sensing signal FSj received during the first period PP1 is stored in the capacitors CA1 and CA2 of the first memory cell MC1. The conveyor signal ICC corresponding to the sensing signal FSj received during the second period PP2 is stored in the capacitors CB1 and CB2 of the second memory cell MC2.

When the sensor scan signal Si (refer to FIG. 7A) is at a high level during the first period PP1, the conveyor signal ICC at a point in time when photocharges of the light sensing element OPD are not delivered to the j-th the readout line RLj as the sensing signal FSj may be delivered to the first memory cell MC1. Accordingly, the capacitors CA1 and CA2 may be charged with a voltage corresponding to noise.

When the sensor scan signal Si (refer to FIG. 7A) is at a low level during the first period PP1, the photocharges of the light sensing element OPD is delivered to the j-th the readout line RLj as the sensing signal FSj, and thus the conveyor signal ICC corresponding to photocharges of the light sensing element OPD may be delivered to the second memory cell MC2. Accordingly, the capacitors CB1 and CB2 may be charged with a voltage corresponding to the photocharges of the light sensing element OPD.

In other words, during the third period PP3, the first voltage signal VCM1 and the second voltage signal VCM2 may have a predetermined voltage difference.

The analog-to-digital converter 1300 (refer to FIG. 13) converts a difference between the first voltage signal VCM1 and the second voltage signal VCM2 into a digital signal (or digital code) to output the readout signal FSS.

A readout circuit of a display device according to an embodiment described above does not include an internal capacitor, and thus there is no need for a time to reset the internal capacitor. Accordingly, the readout circuit may operate at a high speed. Moreover, the readout circuit does not include the internal capacitor, and thus a circuit area may be minimized. In an embodiment, a readout circuit does not include an internal capacitor that needs to be reset. For example, elements 510 and 520 including internal capacitors C_F and C_R may be replaced with current conveyers 1100 and 2000 that excludes use of internal capacitors. In an embodiment, the readout circuit constitute conveyers 1100 and 2000 and the ADC 1300, and the current memory cell 1200 is considered a structure separate from the readout circuit.

The readout circuit may include an amplifier, and the amplifier may remove common mode noise. Accordingly, a dynamic range of a sensing signal from the sensor may be increased.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a pixel including a light emitting element, a sensor including a light sensing element, and a dummy sensor; and a readout circuit configured to output a readout signal based on a sensing signal received from the sensor and a dummy sensing signal received from the dummy sensor, wherein the readout circuit comprises:

a reference current conveyor configured to output a reference signal corresponding to the dummy sensing signal; and a sensing circuit configured to output the readout signal corresponding to a difference between the sensing signal and the reference signal.

2. The display device of claim 1, wherein the sensing circuit comprises:

a current conveyor configured to output a conveyor signal corresponding to the difference between the sensing signal and the reference signal;

a current memory cell configured to store the conveyor signal; and an analog-to-digital converter configured to output the readout signal by converting the conveyor signal from the current memory cell into a digital signal.

3. The display device of claim 2, wherein the current memory cell comprises:

a first memory cell configured to store the conveyor signal corresponding to a difference between the sensing signal received during a first period, and the reference signal; and a second memory cell configured to store the conveyor signal corresponding to a difference between the sensing signal received during a second period different from the first period, and the reference signal.

4. The display device of claim 3, wherein the first memory cell comprises:

a first capacitor configured to store the conveyor signal during the first period; and a second capacitor configured to store the conveyor signal during the first period.

5. The display device of claim 4, wherein the second memory cell includes:

a third capacitor configured to store the conveyor signal during the second period; and a fourth capacitor configured to store the conveyor signal during the second period.

6. The display device of claim 3, wherein the current memory cell further comprises:

an amplifier including a first input terminal, a second input terminal, and an output node and configured to receive a reference voltage from the first input terminal, to receive the conveyor signal from the second input terminal, and to output a current corresponding to the conveyor signal to the output node.

7. The display device of claim 6, wherein the first memory cell comprises:

a first transistor connected between a first voltage terminal and a first node and including a gate electrode connected to a second node;

a first capacitor connected between the first voltage terminal and the second node;

a first switching circuit configured to electrically connect an input node receiving the conveyor signal, and the second node in response to a first switching signal and to deliver the conveyor signal to the second input terminal of the amplifier in response to a second switching signal;

a second transistor connected between the first node and a second voltage terminal, and connected to a third node;

a second capacitor connected between the third node and the second voltage terminal; and a second switching circuit configured to electrically connect the output node of the amplifier and the third node in response to the second switching signal.

8. The display device of claim 7, wherein the second memory cell comprises:

a third transistor connected between the first voltage terminal and a fourth node, and including a gate electrode connected to a fifth node;

a third capacitor connected between the first voltage terminal and the fifth node;

a third switching circuit configured to electrically connect the input node receiving the conveyor signal, and the fifth node in response to a third switching signal and to deliver the conveyor signal to the second input terminal of the amplifier in response to a fourth switching signal;

a fourth transistor connected between the fourth node and the second voltage terminal, and including a gate electrode connected to a sixth node;

a fourth capacitor connected between the sixth node and the second voltage terminal; and a fourth switching circuit configured to electrically connect the output node of the amplifier and the sixth node in response to the fourth switching signal.

9. The display device of claim 2, wherein the reference current conveyor outputs a first reference voltage signal and a second reference voltage signal, which correspond to the dummy sensing signal.

10. The display device of claim 9, wherein the current conveyor comprises:

a first current mirror circuit configured to receive the sensing signal, the first reference voltage signal, the second reference voltage signal, a first bias voltage, and a second bias voltage to output a voltage signal;

a buffer circuit configured to receive the first voltage signal and a reference voltage to output a first voltage and a second voltage; and a second current mirror circuit configured to receive the first voltage, the second voltage, the first bias voltage, and the second bias voltage to output the conveyor signal.

11. The display device of claim 1, wherein the display panel includes a display area, in which the light emitting element and the sensor are disposed, and a non-display area in which the dummy sensor is disposed.

12. The display device of claim 1, wherein the sensor further includes a sensor driving circuit connected to the light sensing element and configured to output the sensing signal corresponding to external light.

13. The display device of claim 12, wherein the sensor driving circuit comprises:

a reset transistor including a first electrode for receiving a reset voltage, a second electrode connected to a first sensing node, and a gate electrode for receiving a reset signal;

an amplification transistor including a first electrode for receiving a driving voltage, a second electrode connected to a second sensing node, and a gate electrode connected to the first sensing node; and an output transistor including a first electrode connected to the second sensing node, a second electrode connected to a readout line for outputting the sensing signal, and a gate electrode for receiving a scan signal.

14. The display device of claim 1, wherein the dummy sensor further includes a sensor driving circuit connected to the light sensing element and configured to output the dummy sensing signal corresponding to external light.

15. A readout circuit comprising:

a reference current conveyor configured to output a reference signal corresponding to a dummy sensing signal from a dummy sensor; and a sensing circuit configured to output a readout signal corresponding to a difference between a sensing signal received from a sensor and the reference signal, wherein the sensing circuit comprises:

a current conveyor configured to output a conveyor signal corresponding to the difference between the sensing signal and the reference signal;

a current memory cell configured to store the conveyor signal; and an analog-to-digital converter configured to output the readout signal by converting the conveyor signal from the current memory cell into a digital signal.

16. The readout circuit of claim 15, wherein the current memory cell comprises:

a first memory cell configured to store the conveyor signal corresponding to a difference between the sensing signal received during a first period, and the reference signal; and a second memory cell configured to store the conveyor signal corresponding to a difference between the sensing signal received during a second period different from the first period, and the reference signal.

17. The readout circuit of claim 16, wherein the current memory cell further comprises:

an amplifier including a first input terminal, a second input terminal, and an output node and configured to receive a reference voltage from the first input terminal, to receive the conveyor signal from the second input terminal, and to output a current corresponding to the conveyor signal to the output node.

18. The readout circuit of claim 16, wherein the first memory cell comprises:

a first capacitor configured to store the conveyor signal during the first period; and a second capacitor configured to store the conveyor signal during the first period, and wherein the second memory cell comprises:

a third capacitor configured to store the conveyor signal during the second period; and a fourth capacitor configured to store the conveyor signal during the second period.

19. The readout circuit of claim 18, wherein the first memory cell comprises:

a first transistor connected between a first voltage terminal and a first node and including a gate electrode connected to a second node;

a first capacitor connected between the first voltage terminal and the second node;

a first switching circuit configured to electrically connect an input node receiving the conveyor signal, and the second node in response to a first switching signal and to deliver the conveyor signal to the second input terminal of the amplifier in response to a second switching signal;

a second transistor connected between the first node and a second voltage terminal, and connected to a third node;

a second capacitor connected between the third node and the second voltage terminal; and a second switching circuit configured to electrically connect the output node of the amplifier and the third node in response to the second switching signal.

20. The readout circuit of claim 19, wherein the second memory cell comprises:

a third transistor connected between the first voltage terminal and a fourth node, and including a gate electrode connected to a fifth node;

a third capacitor connected between the first voltage terminal and the fifth node;

a third switching circuit configured to electrically connect the input node receiving the conveyor signal, and the fifth node in response to a third switching signal and to deliver the conveyor signal to the second input terminal of the amplifier in response to a fourth switching signal;

a fourth transistor connected between the fourth node and the second voltage terminal, and including a gate electrode connected to a sixth node;

a fourth capacitor connected between the sixth node and the second voltage terminal; and a fourth switching circuit configured to electrically connect the output node of the amplifier and the sixth node in response to the fourth switching signal.

* * * * *